United States Patent
Kwon et al.

(10) Patent No.: US 10,198,064 B2
(45) Date of Patent: Feb. 5, 2019

(54) TOUCH DRIVING SIGNAL GENERATING DEVICE, TOUCH DRIVING DEVICE INCLUDING THE SAME, AND DISPLAY DEVICE AND DRIVING METHOD THEREOF

(71) Applicant: LG Display Co., Ltd., Seoul (KR)

(72) Inventors: Soonho Kwon, Seoul (KR); HongSung Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 106 days.

(21) Appl. No.: 15/280,900

(22) Filed: Sep. 29, 2016

(65) Prior Publication Data

US 2017/0090624 A1 Mar. 30, 2017

(30) Foreign Application Priority Data

Sep. 30, 2015 (KR) .................. 10-2015-0138252

(51) Int. Cl.
*G06F 3/044* (2006.01)
*G06F 1/32* (2006.01)
*G06F 3/041* (2006.01)

(52) U.S. Cl.
CPC .......... *G06F 1/3262* (2013.01); *G06F 1/3296* (2013.01); *G06F 3/044* (2013.01);
(Continued)

(58) Field of Classification Search
CPC ...... G06F 3/044; G06F 1/3262; G06F 1/3296; G06F 3/0412; G06F 3/0416; G06F 1/325; G06F 1/3234; G06F 1/3206; G06F 1/3203; G06F 1/32; G06F 1/26; G06F 1/00; G06F 3/047; G06F 3/041; G06F 3/03; G06F 3/00; G06F 3/01; Y02D 10/172; Y02D 10/173; Y02D 10/17; Y02D 10/10; Y02D 10/00

See application file for complete search history.

(56) References Cited

U.S. PATENT DOCUMENTS

| 9,652,090 B2 * | 5/2017 | Tan .................. G06F 3/044 |
| 2010/0110040 A1 * | 5/2010 | Kim .................. G06F 3/0412 345/174 |

(Continued)

FOREIGN PATENT DOCUMENTS

| CN | 102662518 A | 9/2012 |
| CN | 103558941 A | 2/2014 |

(Continued)

OTHER PUBLICATIONS

Tai et al, "Large-Area Capacitive Active Touch Panel Using the Method of Pulse Overlapping Detection", Journal of Display Technology, vol. 9, No. 3, pp. 170-175, Mar. 2013. (Year: 2013).*

*Primary Examiner* — Julie Anne Watko
(74) *Attorney, Agent, or Firm* — Fenwick & West LLP

(57) ABSTRACT

Disclosed are a touch driving device, a driving method thereof, and a display device including the same, which reduce power consumption. A touch driving device comprises a first circuit configured to generate a touch driving signal including a plurality of pulses with varying amplitudes or varying periods, responsive to detection of presence or absence of a touch on the touch sensitive display panel during a touch sensing period, and a second circuit configured to apply the touch driving signal to a touch electrode of the touch sensitive display panel during the touch sensing period.

22 Claims, 13 Drawing Sheets

(52) U.S. Cl.
CPC .......... *G06F 3/0416* (2013.01); *G06F 3/0412* (2013.01); *Y02D 10/172* (2018.01); *Y02D 10/173* (2018.01)

(56) References Cited

U.S. PATENT DOCUMENTS

| | | | | |
|---|---|---|---|---|
| 2010/0328256 A1* | 12/2010 | Harada | ............... | G02F 1/13338 345/174 |
| 2010/0328259 A1* | 12/2010 | Ishizaki | ................. | G06F 3/044 345/174 |
| 2011/0061947 A1* | 3/2011 | Krah | ..................... | G06F 1/3215 178/18.01 |
| 2013/0050116 A1* | 2/2013 | Shin | ........................ | G06F 3/044 345/173 |
| 2013/0265276 A1* | 10/2013 | Obeidat | ................. | G06F 3/044 345/174 |
| 2014/0015791 A1 | 1/2014 | Huang et al. | | |
| 2014/0092051 A1* | 4/2014 | Weinerth | ............... | G06F 3/044 345/174 |
| 2014/0160085 A1* | 6/2014 | Rabii | .................... | G06F 1/3262 345/178 |
| 2015/0177880 A1 | 6/2015 | Shin et al. | | |
| 2017/0060337 A1* | 3/2017 | Kim | ...................... | G06F 3/0412 |

FOREIGN PATENT DOCUMENTS

| | | | | | |
|---|---|---|---|---|---|
| EP | 2887185 | A1 | * | 6/2015 | |
| EP | 2975498 | A1 | * | 1/2016 | ........... G09G 3/3208 |
| JP | 2012128851 | A | * | 7/2012 | ........... G06F 1/3259 |
| KR | 10-2015-0056365 | A | * | 5/2015 | |
| KR | 2015/0056365 | A | | 5/2015 | |

\* cited by examiner

TOUCH DRIVING SIGNAL GENERATING DEVICE, TOUCH DRIVING DEVICE INCLUDING THE SAME, AND DISPLAY DEVICE AND DRIVING METHOD THEREOF

CROSS-REFERENCE TO RELATED APPLICATIONS

This application claims the benefit of the Korean Patent Application No. 10-2015-0138252 filed on Sep. 30, 2015, which is hereby incorporated by reference as if fully set forth herein.

BACKGROUND

Related Field

One or more embodiments relate to a touch driving signal generating device, a touch driving device including the same, and a display device and a driving method thereof, for reducing power consumption.

Discussion of the Related Art

Touch panel is a type of input device, which may be included in an image display device such as a liquid crystal display (LCD) device, field emission display (FED), plasma display panel (PDP), electroluminescent display (ELD), electrophoretic display (EPD), organic light emitting display device, etc., and enables a user to input information by directly touching a screen with a finger, a pen, or the like while looking at the screen of a display device. Touch panels are used as input devices of various products such as televisions (TVs), notebook computers, monitors, etc., in addition to portable electronic devices such as electronic notebooks, e-books, portable multimedia players (PMPs), navigation devices, ultra-mobile personal computers (UM-PCs), mobile phones, smartphones, tablet personal computers (PCs), watch phones, mobile communication terminals, etc.

Recently, the demand for in-cell touch type display devices has increased. In-cell touch type display device includes a plurality of elements that configure a touch panel and are built into a display panel.

FIG. 1 is a waveform diagram showing signals applied to a related art in-cell touch type display device.

Referring to FIG. 1, the related art in-cell touch type display device temporally divides one frame into an image display period DP and a touch sensing period TP according to a touch synchronization signal TSS.

The related art in-cell touch type display device sequentially supplies a gate signal GS to a plurality of gate lines GL1 to GLm during the image display period DP, respectively supplies data voltages synchronized with the gate signal GS to a plurality of data lines DL1 to DLn, and supplies a common voltage Vcom to a plurality of touch electrodes TE used as common electrodes, thereby displaying an image.

Moreover, during the touch sensing period TP, the related art in-cell touch type display device supplies a touch driving signal TDS to the touch electrodes TE to sense a user touch. At this time, the touch driving signal is also supplied to the gate lines GL1 to GLm and the data lines DL1 to DLn.

The related art in-cell touch type display device supplies the touch driving signal TDS to the gate lines GL1 to GLm and the data lines DL1 to DLn during the touch sensing period TP to decrease a load of each of the touch electrodes TE, thereby enhancing a touch sensitivity. For example, in the touch sensing period TP, since the touch driving signal TDS is supplied to the touch electrodes TE, the gate lines GL1 to GLm, and the data lines DL1 to DLn, a parasitic capacitance does not occur among the touch electrodes TE, the gate lines GL1 to GLm, and the data lines DL1 to DLn. Accordingly, a touch sensitivity is enhanced.

However, even when a touch does not occur during the touch sensing period TP in one frame, the touch driving signal TDS is output to the gate lines GL1 to GLm and the data lines DL1 to DLn. Thus, the related art in-cell touch type display device has the same power consumption irrespective of whether there is a touch.

For this reason, in the related art in-cell touch type display device, power is consumed, even when the in-cell touch type display device is not touched.

SUMMARY

Disclosed herein are a touch driving signal generating device, a touch driving device including the same, and a display device and a driving method thereof that substantially obviate one or more problems due to limitations and disadvantages of the related art.

An aspect of the present invention is directed to provide a touch driving signal generating device and a touch driving device including the same, which reduce power consumption when an integrated touch display panel is not touched.

Another aspect of the present invention is directed to provide a touch driving device, and a display device and a driving method thereof, which reduce power consumption.

In one or more embodiments, a touch driving device for driving a touch sensitive display panel is disclosed herein. The touch driving device comprises: a first circuit configured to generate a touch driving signal including a plurality of pulses with varying amplitudes or varying periods (or varying frequencies), responsive to detection of presence or absence of a touch on the touch sensitive display panel during a touch sensing period, and a second circuit configured to apply the touch driving signal to a touch electrode of the touch sensitive display panel during the touch sensing period.

In one or more embodiments, the first circuit is configured to apply the touch driving signal to at least one of a gate line and a data line of the touch sensitive display panel during the touch sensing period.

In one or more embodiments, responsive to determining that the touch sensitive display panel is not touched, the first circuit is further configured to progressively decrease amplitudes of two or more of the plurality of pulses.

In one or more embodiments, responsive to determining that the touch sensitive display panel is touched, the first circuit is further configured to progressively increase amplitudes of two or more pulses of the plurality of pulses.

In one or more embodiments, responsive to determining that the touch sensitive display panel is touched, the first circuit is further configured to generate two or more pulses of the plurality of pulses having a substantially same amplitude.

In one or more embodiments, the first circuit is further configured to divide the plurality of pulses into groups, where pulses in at least one of the groups have a substantially same amplitude.

In one or more embodiments, the touch sensing period comprises a touch period or a non-touch period according to whether the touch sensitive display panel is touched. During the non-touch period, in which the touch sensitive display panel is not determined to be touched, one or more of the plurality of pulses corresponding to the non-touch period may have amplitudes lower than a reference amplitude.

During the touch period, in which the touch sensitive display panel is determined to be touched, one or more of the plurality of pulses corresponding to the touch period may have the reference amplitude.

In one or more embodiments, the first circuit comprises: a clock signal generator configured to generate a plurality of reference pulses, each of the plurality of reference pulses associated with a corresponding one of the plurality of pulses; a modulation voltage generator configured to divide an input voltage having a reference voltage level to generate a plurality of modulation voltages having different voltage levels; a voltage selector configured to select, for each of the plurality of reference pulses, a corresponding modulation voltage from the plurality of modulation voltages; and a voltage varying circuit configured to generate the plurality of pulses by changing, for each of the plurality of reference pulses, an amplitude of a reference pulse of the plurality of reference pulses according to the corresponding modulation voltage.

In one or more embodiments, the touch sensitive display panel displays an image during an image display period, where the touch sensitive display panel comprises a gate line and a data line. The first circuit is configured to apply the plurality of pulses to the gate line and the data line during the touch sensing period simultaneously. The first circuit may be further configured to generate additional plurality of pulses, where each of the additional plurality of pulses has substantially same amplitude as a corresponding one of the plurality of pulses. The plurality of pulses may be centered around a first voltage level, and the additional plurality of pulses may be centered around a second voltage level different than the first voltage level. The first circuit may be further configured to apply the additional plurality of pulses to the gate line during the touch sensing period.

In one or more embodiments, the second circuit comprises: a common voltage generator generating a common voltage; and a first switching unit configured to: connect the touch electrode to the common voltage generator during the image display period to apply the common voltage to the touch electrode, and connect the touch electrode to the first circuit to apply the plurality of pulses to the touch electrode and determine whether the touch sensitive display panel is touched or not.

In one or more embodiments, the touch driving device further comprises: a data driving circuit unit configured to: apply a data signal to the data line during the image display period for displaying the image, and apply the touch driving signal from the first circuit to the data line during the touch sensing period. The data driving circuit unit may further comprise: a data driver configured to generate the data signal; and a second switching unit configured to: connect the data line to the data driver to supply the data signal to the data line during the image display period, and connect the data line to the first circuit to apply the plurality of pulses to the data line during the touch sensing period.

In one or more embodiments, a display device is disclosed herein. The display device includes a touch sensitive display panel including a gate line, a data line, and a touch electrode; and the touch driving device as disclosed.

In one or more embodiments, the first circuit of the touch driving device is further configured to: apply the touch driving signal to at least one of the gate line and the data line of the touch sensitive display panel during the touch sensing period.

In one or more embodiments, a method of sensing a touch by a touch sensitive display panel comprising a gate line, a data line, and a touch electrode is disclosed. The method comprises: displaying an image by the touch sensitive display panel during an image display period; generating a touch driving signal including a plurality of pulses with varying amplitudes or varying periods during a touch sensing period, responsive to determining whether the touch sensitive display panel is touched or not; and applying the touch driving signal to the touch electrode during the touch sensing period.

In one or more embodiments, the method further comprises: generating additional plurality of pulses, each of the additional plurality of pulses having a same amplitude with a corresponding one of the plurality of pulses, the plurality of pulses centered around a first voltage level, the additional plurality of pulses centered around a second voltage level different from the first voltage level; applying the additional plurality of pulses to the gate line during the touch sensing period; and applying the plurality of pulses to the data line during the touch sensing period.

In one or more embodiments, the method further comprises progressively decreasing amplitudes of two or more of the plurality of pulses, responsive to determining that the touch sensitive display panel is not touched during the touch sensing period.

In one or more embodiments, the method further comprises progressively increasing amplitudes of two or more pulses of the plurality of pulses, responsive to determining that the touch sensitive display panel is touched during the touch sensing period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch driving signal generating device, a touch driving device including the same, and a display device and a driving method thereof, which generate a touch driving signal which is to be supplied to a gate line, a data line, and a touch electrode provided in a display panel, and vary a voltage level of the touch driving signal depending on whether the displayed panel is touched during a touch sensing period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1:
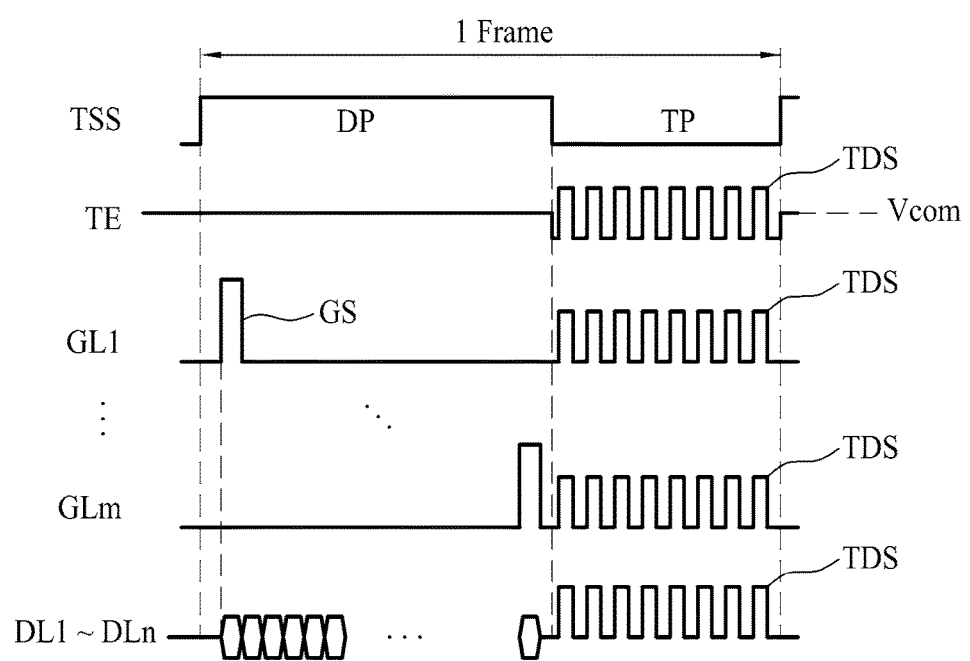
FIG. 1 is a waveform diagram showing signals applied to a related art in-cell touch type display device.

Reference will now be made in detail to the exemplary embodiments, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" may be construed as including a case where one element is formed at a top of another element and moreover a case where a third element is disposed therebetween.

Hereinafter, exemplary embodiments of a touch driving device and a display device including the same will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description thereof will be omitted.

Figure 2:
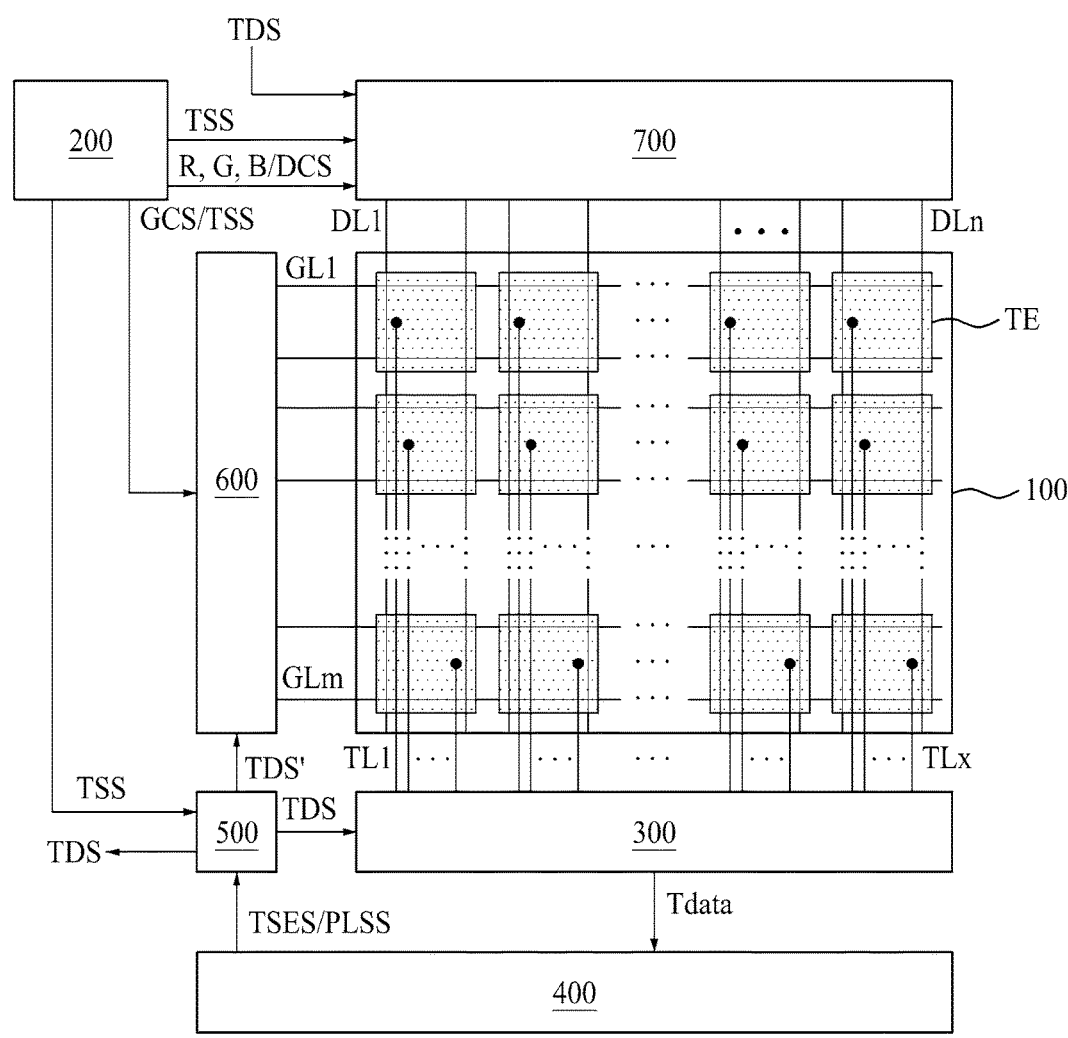
FIG. 2 is a diagram for describing a display device according to an embodiment.
Figure 3:
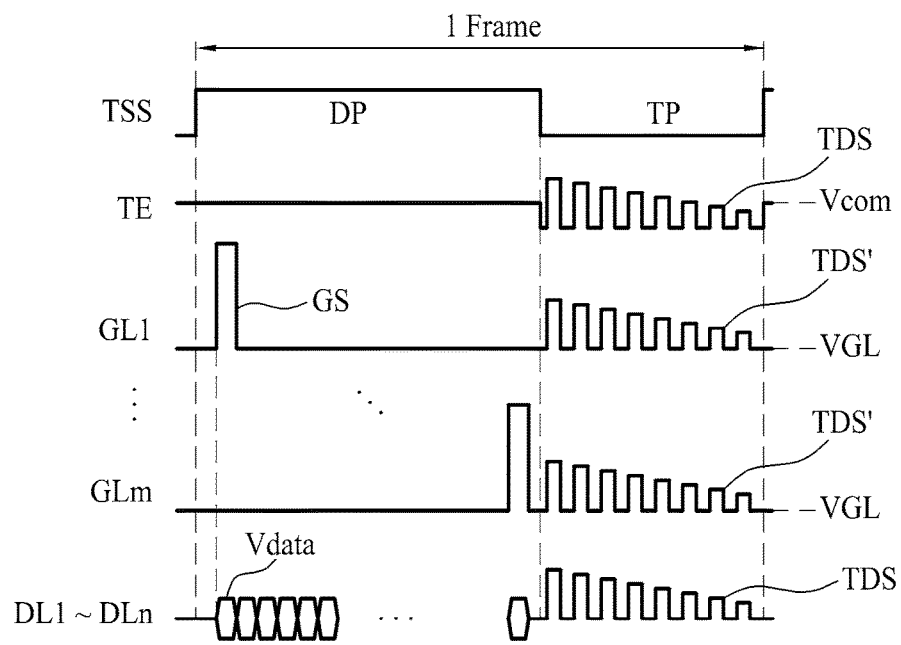
FIG. 3 is a waveform diagram showing a signal applied to a display panel illustrated in FIG. 2.
Figure 4:
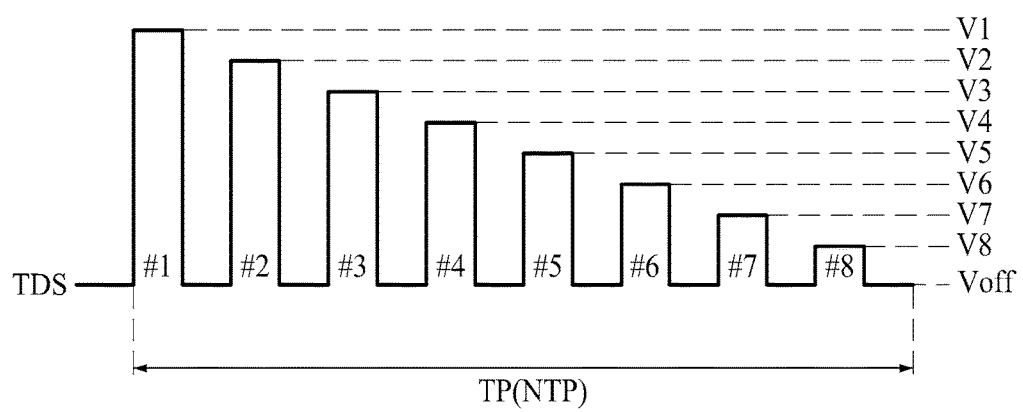
FIG. 4 is an enlarged waveform diagram of a touch driving signal when the display panel is not touched during a touch sensing period.

FIG. 2 is a diagram for describing a display device according to an embodiment. FIG. 3 is a waveform diagram showing a signal applied to a display panel illustrated in FIG. 2. FIG. 4 is an enlarged waveform diagram of a touch driving signal when the display panel is not touched during a touch sensing period.

Referring to FIGS. 2 to 4, the display device according to an embodiment may include a display panel 100, a timing controller 200, a touch driving circuit unit 300, a touch controller 400, a touch driving signal generator 500, a gate driving circuit unit 600, and a data driving circuit unit 700. Each of these components may be implemented as hardware circuits.

The display panel 100 may include a built-in touch panel and may display an image by using light irradiated from a backlight unit (not shown).

The display panel 100 according to an embodiment may include a thin film transistor (TFT) array substrate (or a first substrate), a color filter array substrate (or a second substrate), and a liquid crystal layer disposed therebetween.

The TFT array substrate may include a plurality of subpixels which are arranged in a lattice type.

The plurality subpixels may be respectively provided in a plurality of pixel areas defined by a plurality of gate lines GL1 to GLm and a plurality of data lines DL1 to DLn. In this case, examples of the subpixels may include a red subpixel, a green subpixel, and a blue subpixel, and one pixel may include a red subpixel, a green subpixel, and a blue subpixel which are adjacent to each other. The plurality of subpixels may each include a TFT connected to a gate line and a data line, a pixel electrode connected to the TFT, a common electrode (or a touch electrode) TE which generates an electric field along with the pixel electrode, and a storage capacitor connected to the TFT. Here, the pixel electrode may be provided in each of the subpixels, and the common electrode may be provided in units of a plurality of subpixels adjacent to each other.

The common electrode may be used as an electrode for displaying an image, and moreover, may be used as the touch electrode TE for sensing a touch. To this end, the touch electrode TE may be patterned in units of a plurality of subpixels adjacent to each other, and thus, may overlap at least one gate line GL and at least one data line DL. The pixel electrode and the touch electrode TE may each be formed of a transparent conductive material such as indium tin oxide (ITO) and/or the like.

One touch electrode TE may have an area corresponding to a plurality of pixels. For example, the one touch electrode TE may have an area which corresponds to forty pixels in a horizontal direction parallel to a lengthwise direction of the gate line GL and corresponds to twelve pixels in a vertical direction parallel to a lengthwise direction of the data line DL. In this case, the one touch electrode TE may have an area encompassing 480 pixels. However, the present embodiment is not limited thereto, and a size of the touch electrode TE may be adjusted based on a desired touch resolution and a size of the display panel 100. Also, a plurality of touch electrodes TE may be arranged in a lattice type in the display panel 100. In this case, the plurality of touch electrodes TE may not have the same size, and a plurality of second touch electrodes disposed in an edge of the display panel 100 may be smaller in size than a plurality of first touch electrodes disposed in a center of the display panel 100. In this case, a touch sensitivity between the center and the edge of the display panel 100 can be uniform.

One end of each of the plurality of gate lines GL1 to GLm may be connected to the gate driving circuit unit 600, and one end of each of the plurality of data lines DL1 to DLn may be connected to the data driving circuit unit 700. Also, the plurality of touch electrodes TE may be respectively connected to a plurality of touch link lines TL1 to TLx in a one-to-one relationship, and the plurality of touch link lines TL1 to TLx may be connected to the touch driving circuit unit 300.

The timing controller 200 may receive a timing synchronization signal including a data enable signal, a reference clock signal, a vertical synchronization signal, and a horizontal synchronization signal supplied from an external display driving system (not shown). The timing controller 200 may temporally divide each frame into the image display period DP and the touch sensing period TP. In addition, the timing controller 200 may generate a touch synchronization signal TSS based on the received timing synchronization signal to drive the touch driving circuit unit 300, the gate driving circuit unit 600, and the data driving circuit unit 700 in a time division manner.

Moreover, the timing controller 200 may generate a gate control signal GCS for supplying a gate signal GS to the gate line GL and a data control signal DCS for supplying a data signal to the data line DL during the image display period DP, based on the timing synchronization signal.

The timing controller 200 may receive video data supplied from the external display driving system (not shown), align the received video data to generate pixel data R, G and B according to a pixel structure of the display panel 100, and supply the pixel data to the data driving circuit unit 700 during the image display period DP.

The touch driving circuit unit 300 may be defined as a touch driving device or a touch driving integrated circuit (IC) connected to the gate lines GL, the data lines DL, and the touch electrodes TE which are provided in the display panel 100. The touch driving circuit unit 300 may be built into the timing controller 200 or the data driving circuit unit 700, and in this case, the number of elements of the display device according to the present embodiment can be reduced.

During the image display period DP, the touch driving circuit unit 300 may supply the common voltage Vcom to the touch electrodes TE respectively connected to the plurality of touch link lines TL1 to TLx in response to the touch synchronization signal TSS supplied from the timing controller 200.

During the touch sensing period TP, the touch driving circuit unit 300 according to an embodiment may individually supply a touch driving signal TDS, supplied from the touch driving signal generator 500, to the touch electrodes TE or predetermined touch electrode groups through the respective touch link lines TL1 to TLx, sense a touch signal through each of the touch electrodes TE to generate touch data Tdata, and supply the generated touch data Tdata to the touch controller 400.

During the touch sensing period TP, the touch driving circuit unit 300 according to another embodiment may sense a capacitance variation of the touch electrode TE to generate the touch data Tdata by using the touch driving signal TDS, which is supplied from the touch driving signal generator 500 during the touch sensing period TP, as a reference voltage and may supply the generated touch data Tdata to the touch controller 400. That is, during the touch sensing period TP, the touch driving circuit unit 300 according to another embodiment may sense a touch signal based on a capacitance variation of the touch electrode TE by using a sensing unit that includes an operational amplifier, including an inverting terminal, a non-inverting terminal, and an output terminal, and a feedback capacitor connected between the inverting terminal and the output terminal of the operational amplifier. In this case, the touch driving signal TDS may be supplied to the non-inverting terminal of the operational amplifier, and the touch electrode TE may be connected to the inverting terminal of the operational amplifier.

The touch controller 400 may analyze the touch data Tdata supplied from the touch driving circuit unit 300 to determine whether there is a touch, generate a touch presence signal TSES and a pulse level selection signal PLSS according to a result of the determination, and supply the touch presence signal TSES and the pulse level selection signal PLSS to the touch driving signal generator 500. Here, the touch controller 400 may determine whether there is a touch, based on a reduction in capacitance of the touch electrode TE. The touch controller 400 may be built into the timing controller 200 or the touch driving circuit unit 300. In this case, the number of elements of the display device according to the present embodiment can be reduced.

When it is determined that a touch occurred (i.e., when a touch panel is touched), during the touch sensing period TP, the touch controller 400 according to an embodiment may generate the touch presence signal TSES having a first logic level and the pulse level selection signal PLSS having a reference level data value. In addition, the touch controller 400 supplies the touch presence signal TSES and the pulse level selection signal PLSS to the touch driving signal generator 500, and may calculate touch position information based on the touch data Tdata. The touch data Tdata may be supplied to an external host controller (not shown). The external host controller (e.g., a micro controller unit (MCU)), may control the display device and may execute an application program associated with the touch position information supplied from the touch controller 400.

On the other hand, when it is determined that a touch does not occur, in order to reduce power consumption, during the touch sensing period TP, the touch controller 400 according to an embodiment may generate the touch presence signal TSES having a second logic level different from the first logic level and the pulse level selection signal PLSS having a variable level data value. A portion of a touch sensing period TP, during which the touch panel is not touched, is herein referred to as a non-touch period (NTP). A portion of a touch sensing period TP, during which the touch panel is touched, is herein referred to as an actual touch period (RTP). In addition, the touch controller 400 may supply the touch presence signal TSES and the pulse level selection signal PLSS to the touch driving signal generator 500, and may analyze the touch data Tdata supplied from the touch driving circuit unit 300 to repeatedly determine whether there is a touch or not.

The touch presence signal TSES having the first logic level may be defined as a touch existence signal, and the touch presence signal TSES having the second logic level may be defined as a touch nonexistence signal.

The pulse level selection signal PLSS may be a signal for varying a voltage level (or amplitude) of each of touch driving signals TDS and TDS'. For example, the pulse level selection signal PLSS having the reference level data value may be a signal for setting a voltage level of each of a plurality of driving pulses, included in the touch driving signals TDS and TDS', to a reference voltage level, and the pulse level selection signal PLSS having the variable level data value may be a signal for setting the voltage level of each of the plurality of driving pulses, included in the touch driving signals TDS and TDS', to a voltage level different from the reference voltage level. The pulse level selection signal PLSS may include N-bit (where N is a natural number equal to or more than two) digital data.

During the touch sensing period TP, the touch driving signal generator 500 may generate the touch driving signals TDS and TDS' corresponding to the touch presence signal TSES and the pulse level selection signal PLSS supplied from the touch controller 400 and may simultaneously supply the touch driving signals TDS and TDS' to the touch driving circuit unit 300, the gate driving circuit unit 600, and the data driving circuit unit 700. The touch driving signal generator 500 (also herein referred to as "a touch driving signal generating device"), may be a power management IC which is built into a power supply of the display device or is mounted on a power supply board which is provided separately from the power supply. Also, the touch driving signal generator 500 may be built into the timing controller 200, the touch driving circuit unit 300, or the data driving circuit unit 700. In this case, the number of elements of the display device according to the present embodiment can be reduced.

During the touch sensing period TP, in response to the touch presence signal TSES corresponding to the touch existence signal supplied from the touch controller 400, the touch driving signal generator 500 may generate a touch driving signal (i.e., first and second touch driving signals TDS and TDS') including a plurality of driving pulses having a reference voltage level according to the pulse level selection signal PLSS having the reference level data value and may simultaneously supply the touch driving signal to the touch driving circuit unit 300, the gate driving circuit unit 600, and the data driving circuit unit 700. Therefore, the first and second touch driving signals TDS and TDS' may be synchronized with each other and may be supplied to the touch driving circuit unit 300 (or a touch electrode), the plurality of gate lines GL, and the plurality of data lines DL. Thus, a load caused by a parasitic capacitance between the touch electrodes TE, the gate lines GL, and the data lines DL is reduced, thereby enhancing a touch sensitivity. Here, the first and second touch driving signals TDS and TDS' may have same amplitude and phase.

During the touch sensing period TP, in response to the touch presence signal TSES corresponding to the touch nonexistence signal supplied from the touch controller 400, the touch driving signal generator 500 may generate the first and second touch driving signals TDS and TDS' including a plurality of driving pulses having a voltage level different from the reference voltage level according to the pulse level selection signal PLSS having the variable level data value and may simultaneously supply the first and second touch driving signals TDS and TDS' to the touch driving circuit unit 300, the gate driving circuit unit 600, and the data driving circuit unit 700. The first touch driving signal TDS may be supplied to the touch driving circuit unit 300 (or the touch electrode) and the plurality of data lines DL, and the second touch driving signals TDS' may be supplied to the plurality of gate lines GL in synchronization with the first touch driving signals TDS. Therefore, the first and second touch driving signals TDS and TDS' may have a lower voltage level than the reference voltage level. By lowering voltage levels of the first and second touch driving signals TDS and TDS' from the reference voltage level during the touch sensing period TP, amplitudes of the first and second touch driving signals TDS and TDS' can be reduced. As a result, power consumption can be reduced.

The touch driving signal generator 500 according to a first embodiment may generate the first and second touch driving signals TDS and TDS' including a plurality of driving pulses #1 to #8. In this case, the touch driving signal generator 500 according to the first embodiment may generate the plurality of driving pulses #1 to #8 having the reference voltage level or the plurality of driving pulses #1 to #8 having different amplitudes according to the touch presence signal TSES and the pulse level selection signal PLSS.

When the touch sensing period TP is a touch period, the touch driving signal generator 500 according to the first embodiment may generate the first and second touch driving signals TDS and TDS' including the plurality of driving pulses #1 to #8 having a reference voltage level V1 according to the touch presence signal TSES (i.e., the touch existence signal) having the first logic level and the pulse level selection signal PLSS having the reference level data value, which are supplied from the touch controller 400. Accordingly, a load caused by a parasitic capacitance between the touch electrodes TE, the gate lines GL, and the data lines DL is reduced.

On the other hand, when the touch sensing period is a non-touch period NTP, the touch driving signal generator 500 according to the first embodiment may generate the plurality of driving pulses #1 to #8 having different voltage levels according to the touch presence signal TSES (i.e., the touch nonexistence signal) having the second logic level and the pulse level selection signal PLSS having the variable level data value, which are supplied from the touch controller 400. Therefore, when there is no touch in the touch sensing period TP, the voltage levels or amplitudes of the first and second touch driving signals TDS and TDS' are lowered, thereby reducing power consumption. For example, during the non-touch period NTP of the touch sensing period TP, the touch driving signal generator 500 according to the first embodiment may progressively lower the voltage levels of the plurality of driving pulses #1 to #8 from the reference voltage level V1, and thus, when there is no touch in the touch sensing period TP, a power consumption caused by outputs of the first and second touch driving signals TDS and TDS' can be minimized.

Figure 5:
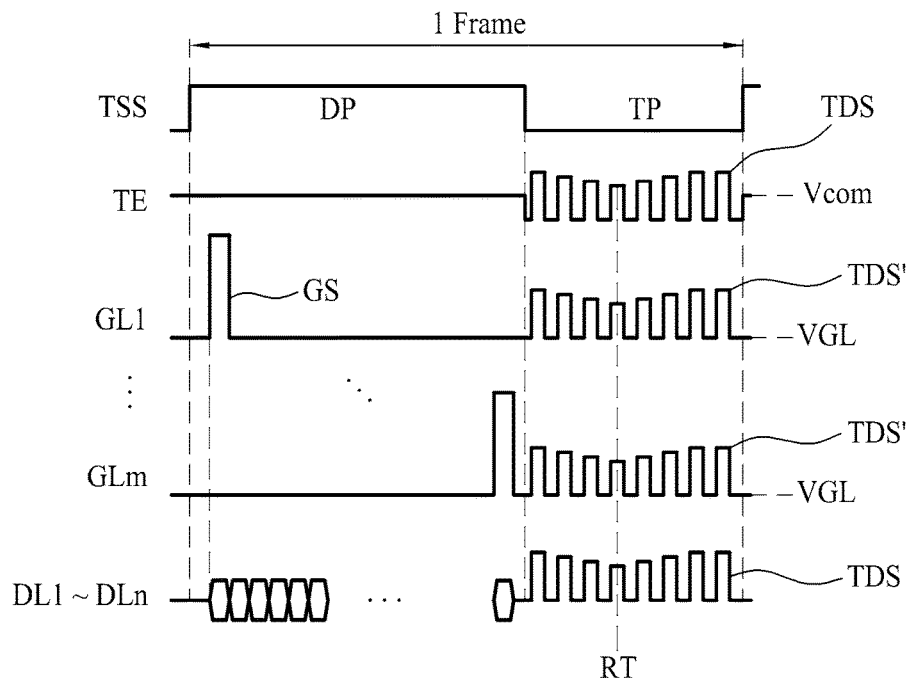
FIG. 5 is a waveform diagram showing an example of a signal applied to the display panel when the panel is touched during the touch sensing period.
Figure 6:
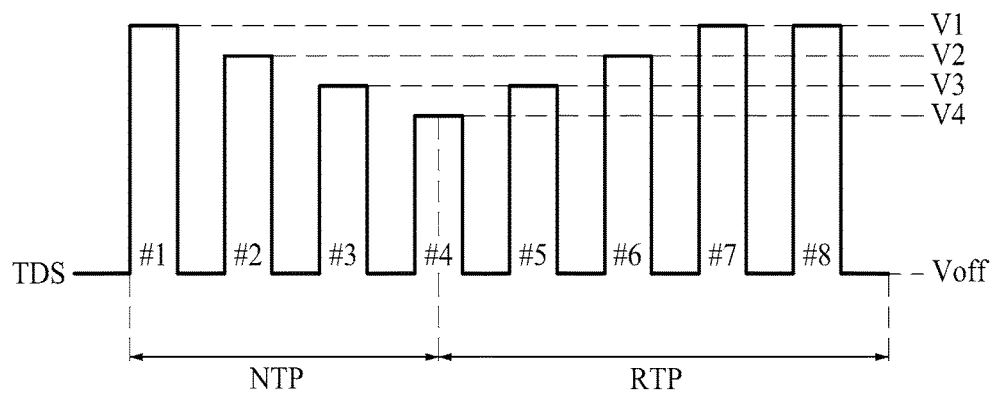
FIG. 6 is an enlarged waveform diagram of the touch sensing period shown in FIG. 5.

Moreover, as shown in FIGS. 5 and 6, when an actual touch RT occurs in the touch sensing period TP, the touch driving signal generator 500 according to the first embodiment may shift some of the plurality of driving pulses #1 to #8 to a voltage level lower than the reference voltage level during the non-touch period NTP of the touch sensing period TP and then may shift the other driving pulses to the reference voltage level during a touch period RTP of the touch sensing period TP corresponding to a time when the actual touch RT occurs, thereby enabling a touch to be normally sensed during the other period of the touch sensing period TP.

That is, during the non-touch period NTP of the touch sensing period TP, the touch driving signal generator 500 according to the first embodiment may progressively decrease voltage levels of driving pulses #1 to #4 of the plurality of driving pulses #1 to #8 from the reference voltage level V1 in response to a second touch presence signal TSES and the pulse level selection signal PLSS having the variable level data value, which are supplied from the touch controller 400. Also, during the touch period RTP of the touch sensing period TP, the touch driving signal generator 500 according to the first embodiment may cause voltage levels of driving pulses #5 to #8 of the plurality of driving pulses #1 to #8 to be progressively increased in that sequence in response to a first touch presence signal TSES and the pulse level selection signal PLSS having the reference level data value, which are supplied from the touch controller 400. For example, in a case where the first and second touch driving signals TDS and TDS' include first to eighth driving pulses #1 to #8 and the actual touch RT occurs at a time when a fourth driving pulse #4 is output, the touch driving signal generator 500 according to the first embodiment may cause the voltage levels or amplitudes of the first to fourth driving pulses #1 to #4 to be progressively decreased in that sequence during the non-touch period NTP of the touch sensing period TP, and during the other actual touch period RTP of the touch sensing period TP where the actual touch RT occurs, may cause the voltage levels or amplitudes of the fifth to eighth driving pulses #5 to #8 to be progressively increased in that sequence.

Figure 7:
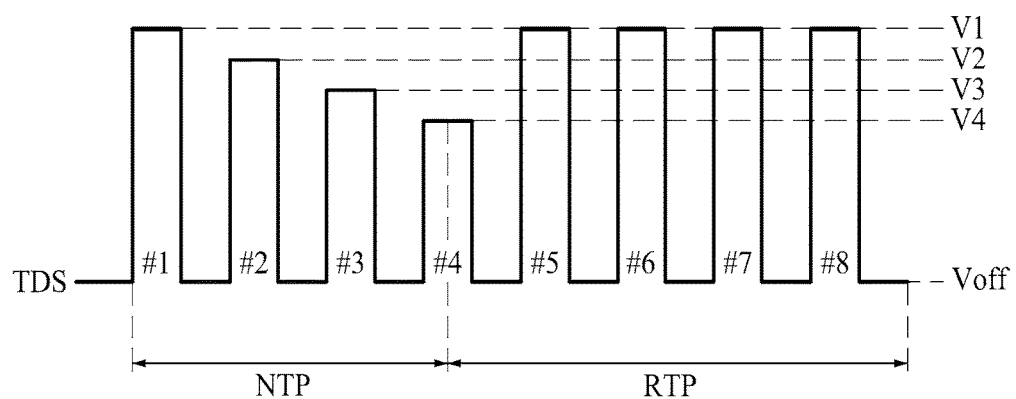
FIG. 7 is a waveform diagram showing another example of a touch driving signal when the touch display panel is touched during the touch sensing period.

In addition, as shown in FIG. 7, the touch driving signal generator 500 according to the first embodiment may cause the voltage level of the fifth to eighth driving pulses #5 to #8 to be at the reference voltage level V1 during the touch period RTP of the touch sensing period TP where the actual touch RT occurs. In this case, touch sensing can be more stably performed during the other period of the touch sensing period TP.

Referring again to FIGS. 2 to 7, the gate driving circuit unit 600 may sequentially supply the gate signal GS to the plurality of gate lines GL1 to GLm during the image display period DP in response to the touch synchronization signal TSS and the gate control signal GCS supplied from the timing controller 200, thereby turning on the TFTs connected to each of the plurality of gate lines GL1 to GLm in units of one horizontal period of the display panel 100.

Moreover, the gate driving circuit unit 600 may simultaneously supply the second touch driving signal TDS', supplied from the touch driving signal generator 500, to the plurality of gate lines GL1 to GLm during the touch sensing period TP in response to the touch synchronization signal TSS. At this time, the second touch driving signal TDS' supplied to the plurality of gate lines GL1 to GLm may be synchronized with the first touch driving signal TDS supplied to the touch driving circuit unit 300 (or the touch electrode) and may have the same phase and the same amplitude as the first touch driving signal TDS.

The data driving circuit unit 700 may convert pixel data R, G and B, supplied from the timing controller 200 in units of one horizontal period, into analog data signals and may simultaneously supply the analog data signals to the plurality of data lines DL1 to DLn during the image display period DP in response to the data control signal DCS and the touch synchronization signal TSS supplied from the timing controller 200, thereby respectively supplying the data signals to pixel electrodes of subpixels through TFTs turned on by the gate signal GS.

Moreover, the data driving circuit unit 700 may simultaneously supply the first touch driving signal TDS, supplied from the touch driving signal generator 500, to the plurality of data lines DL1 to DLn during the touch sensing period TP in response to the touch synchronization signal TSS supplied from the timing controller 200. At this time, the first touch driving signal TDS supplied to the plurality of data lines DL1 to DLn may have a same phase and the same amplitude as the second touch driving signal TDS' in synchronization with the second touch driving signal TDS' supplied to the gate lines GL1 to GLm.

Figure 8:
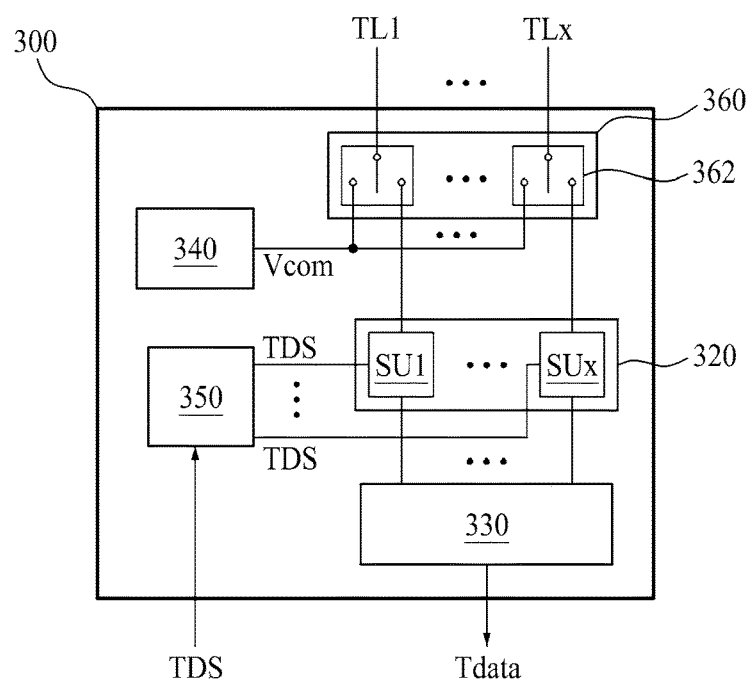
FIG. 8 is a diagram for describing a touch driving circuit unit according to an embodiment illustrated in FIG. 2.

FIG. 8 is a diagram for describing the touch driving circuit unit 300 according to an embodiment illustrated in FIG. 2.

Referring to FIG. 8, the touch driving circuit unit 300 according to an embodiment may include a touch sensing unit 320.

During the touch sensing period TP, the touch driving circuit unit 300 according to an embodiment may sense a capacitance variation of the touch electrode TE to generate the touch data Tdata by using the first touch driving signal TDS, which is supplied from the touch driving signal generator 500 during the touch sensing period TP, as a reference voltage, and may supply the generated touch data Tdata to the touch controller 400. The touch sensing unit 320 according to an embodiment may include a plurality of sensing units SU1 to SUx.

The plurality of sensing units SU1 to SUx may each include a touch sensing circuit and an analog-to-digital converter (ADC, not shown).

The touch sensing circuit may amplify a capacitance variation rate of the touch electrode TE received through a touch link line TL to generate a touch signal. The touch sensing circuit according to an embodiment may include an integrator that compares a reference voltage with a signal received from the touch link line TL to output the touch signal.

The integrator according to an embodiment may include an operational amplifier (not shown), including an inverting terminal, a non-inverting terminal, and an output terminal, and a feedback capacitor connected between the inverting terminal and the output terminal of the operational amplifier. Here, the inverting terminal of the integrator may be connected to the touch electrode TE through the touch link line TL. The non-inverting terminal of the integrator may receive the first touch driving signal TDS, supplied from the touch driving signal generator 500, as the reference voltage.

The ADC may convert an analog output signal, output from a touch sensing circuit, into a digital signal to generate the touch data Tdata.

The touch sensing unit 320 according to another embodiment may sense a touch signal based on a capacitance variation of the touch electrode TE to generate the touch data Tdata by using a reference voltage supplied from a reference voltage source during the touch sensing period TP, and may supply the generated touch data Tdata to the touch controller 400. In this case, the touch sensing unit 320 according to another embodiment may supply the first touch driving signal, supplied from the touch driving signal generator 500, to the touch electrode TE through the touch link line TL. Also, the non-inverting terminal of the integrator included in each of the sensing units SU1 to SUx may receive the reference voltage supplied from the reference voltage source.

In addition, the touch driving circuit unit 300 according to an embodiment may further include a touch data processor 330, a common voltage generator 340, a first touch driving pulse supply unit 350, and a first switching unit 360.

The touch data processor 330 may temporarily store the touch data Tdata, supplied from the touch sensing unit 320, in an internal memory and may supply the touch data Tdata stored in the internal memory to the touch controller 400 in response to a touch report signal.

In the image display period DP, the common voltage generator 340 may generate the common voltage Vcom which is to be supplied to the touch electrode TE and may supply the common voltage Vcom to the first switching unit 360. Alternatively, the common voltage generator 340 may perform only an operation of receiving the common voltage Vcom supplied from an external power circuit to transfer or relay the common voltage Vcom to the first switching unit 360 without generating the common voltage Vcom.

The first touch driving pulse supply unit 350 may supply the touch driving signal TDS, supplied from the touch driving signal generator 500, to a corresponding sensing unit in response to a channel selection signal supplied from the touch controller 400. That is, the first touch driving pulse supply unit 350 may supply the touch driving signal TDS to a corresponding sensing unit according to the channel selection signal corresponding to a predetermined sensing order for the plurality of touch electrodes TE.

In addition, the channel selection signal may be a channel individual selection signal for individually performing touch sensing on the plurality of touch electrodes TE or may be a channel group selection signal for performing group touch sensing by grouping two or more touch electrodes TE. In this case, the touch sensing unit 320 may perform individual touch sensing on the plurality of touch electrodes TE in response to the channel individual selection signal, and in response to the channel group selection signal, may perform the group touch sensing on the plurality of touch electrodes TE.

The first switching unit 360 may connect the plurality of touch link lines TL1 to TLx to the common voltage generator 340 or the touch sensing unit 320 in response to the channel selection signal supplied from the touch controller 400. To this end, the first switching unit 360 may include a plurality of first switch elements 362 which are switched on/off in response to the channel selection signal.

During the image display period DP, the plurality of first switch elements 362 according to an embodiment may supply the common voltage Vcom, supplied from the common voltage generator 340, to the plurality of touch link lines TL1 to TLx to simultaneously supply the common voltage Vcom to the plurality of touch electrodes TE, thereby allowing the plurality of touch electrodes TE to act as common electrodes.

Moreover, the plurality of first switch elements 362 according to an embodiment may respectively connect the plurality of touch link lines TL1 to TLx to the sensing units SU1 to SUx of the touch sensing unit 320 during the touch sensing period TP.

The touch driving circuit unit 300 according to an embodiment may be configured with at least one touch driving IC, based on the number of the touch link lines TL1 to TLx.

Figure 9:
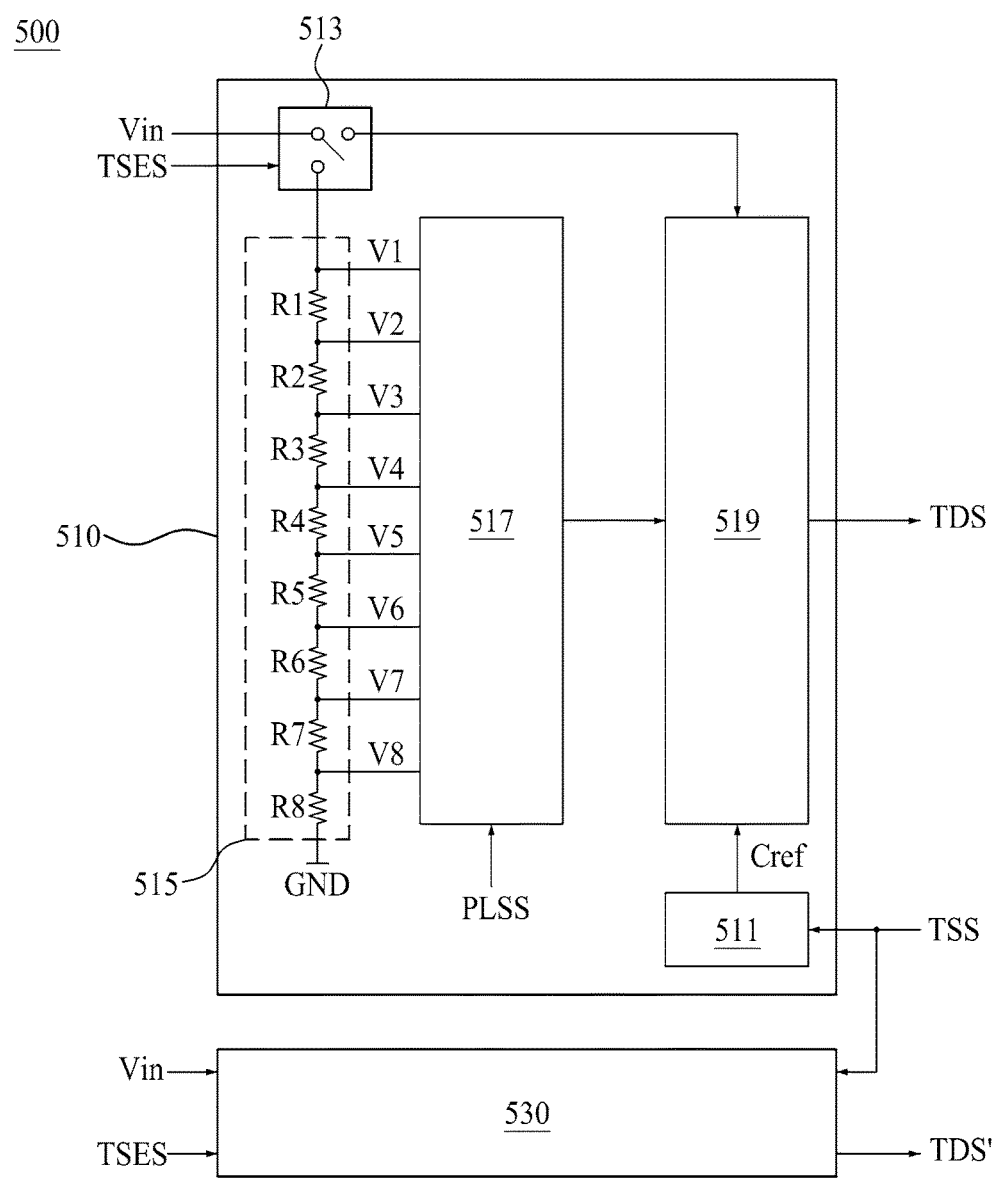
FIG. 9 is a diagram for describing a touch driving signal generator illustrated in FIG. 2.

FIG. 9 is a diagram for describing the touch driving signal generator 500 according to an embodiment illustrated in FIG. 2.

Referring to FIGS. 2 and 9, as described above, the touch driving signal generator 500 according to an embodiment may generate the first touch driving signal TDS, which is to be supplied to the data lines DL and the touch electrode TE, and the second touch driving signal TDS' which is to be supplied to the gate lines GL. The touch driving signal generator 500 may vary the voltage levels of the first and second touch driving signals TDS and TDS' according to whether there is a touch, supply the first touch driving signal TDS with varying amplitudes to the touch driving circuit unit 300 and the data driving circuit unit 700, and supply the second touch driving signal TDS' with varying amplitudes and synchronized with the first touch driving signal TDS to the gate driving circuit unit 600.

The touch driving signal generator 500 according to an embodiment may include a first driving signal generator 510 and a second driving signal generator 530.

The first driving signal generator 510 according to an embodiment may include a clock signal generator 511, a power switch 513, a modulation voltage generator 515, a voltage selector 517, and a voltage varying unit 519.

The clock signal generator 511 may generate a reference clock signal Cref having a plurality of reference touch pulses during the touch sensing period TP in response to the touch synchronization signal TSS supplied from the timing controller 200.

The power switch 513 may supply an input voltage Vin having a reference voltage level V1 to the modulation voltage generator 515 or the voltage varying unit 519 (herein also referred to as a voltage varying circuit 519) in response to the touch presence signal TSES supplied from the touch controller 400. That is, the power switch 513 may supply the input voltage Vin to the voltage varying unit 519 in response to the touch existence signal which is the touch presence signal TSES having the first logic level, and may supply the input voltage Vin to the modulation voltage generator 515 in response to the touch nonexistence signal which is the touch presence signal TSES having the second logic level.

The modulation voltage generator 515 may voltage-divide the input voltage Vin having the reference voltage level supplied from the power switch 513 to generate a plurality of modulation voltages V1 to V8 having different voltage levels which are progressively decreased from the reference voltage level V1. To this end, the modulation voltage generator 515 may include first to eighth voltage division resistors R1 to R8. The modulation voltage generator 515 may supply the plurality of modulation voltages V1 to V8 having different voltage levels, which are respectively generated at voltage division nodes between the first to eighth voltage division resistors R1 to R8 according to resistance values of the first to eighth voltage division resistors R1 to R8, to the voltage selector 517.

The voltage selector 517 may select one of the plurality of modulation voltages V1 to V8 during a corresponding time period to output the selected modulation voltages to the voltage varying unit 519 in response to the pulse level selection signal PLSS supplied from the touch controller 400.

The voltage selector 517 according to an embodiment, may sequentially select one of first to eighth modulation voltages V1 to V8 at a corresponding time period to generate a series of pulses having different amplitudes as shown in FIGS. 3 and 4.

In response to the pulse level selection signal PLSS, as shown in FIGS. 5 and 6, the voltage selector 517 according to another embodiment may sequentially select the first to fourth modulation voltages V1 to V4 progressively decreasing from the reference voltage level V1 to supply the selected modulation voltages to the voltage varying unit 519 during the non-touch period NTP of the touch sensing period TP, and then, during the actual touch period RTP of the touch sensing period TP, may sequentially select the fourth to first modulation voltages V4 to V1 progressively increasing from the fourth modulation voltage level V4 to the reference voltage level V1 to supply the selected modulation voltages to the voltage varying unit 519.

In response to the pulse level selection signal PLSS, as shown in FIG. 7, the voltage selector 517 according to another embodiment may sequentially select the first to fourth modulation voltages V1 to V4 progressively decreasing from the reference voltage level V1 to supply the selected modulation voltages to the voltage varying unit 519 during the non-touch period NTP of the touch sensing period TP, and then, during the actual touch period RTP of the touch sensing period TP, may select the modulation voltage V1 having the reference voltage level V1 to repeatedly supply the selected modulation voltage V1 to the voltage varying unit 519.

Referring again to FIGS. 2 and 9, the voltage varying unit 519 may vary voltage levels of a plurality of reference touch pulses supplied from the clock signal generator 511 to generate a plurality of driving pulses by using the input voltage Vin having the reference voltage level V1 supplied from the power switch 513 or the modulation voltages V1 to V8 supplied from the voltage selector 517. The voltage varying unit 519 according to an embodiment may be configured with a level shifter.

For example, during the touch sensing period TP, the voltage varying unit 519 may shift voltage levels of first to eighth reference touch pulses, supplied from the clock signal generator 511, to the input voltage Vin having the reference voltage level V1 supplied from the power switch 513 to generate first to eighth driving pulses.

During the touch sensing period TP, as shown in FIGS. 3 and 4, the voltage varying unit 519 according to another embodiment may respectively shift the voltage levels of the first to eighth reference touch pulses, supplied from the clock signal generator 511, to the first to eighth modulation voltages V1 to V8 selected and supplied by the voltage selector 517 to generate the first to eighth driving pulses.

The voltage varying unit 519 according to another embodiment, as shown in FIGS. 5 and 6, may respectively shift the voltage levels or amplitudes of the first to fourth reference touch pulses, supplied from the clock signal generator 511, according to the first to fourth modulation voltages V1 to V4 selected and supplied by the voltage selector 517 to generate the first to fourth driving pulses during the non-touch period NTP of the touch sensing period TP, and then, during the actual touch period RTP of the touch sensing period TP, may respectively shift the voltage levels or amplitudes of the fifth to eighth reference touch pulses, supplied from the clock signal generator 511, according to the fourth to first modulation voltages V4 to V1 selected and supplied by the voltage selector 517 to generate the fifth to eighth driving pulses.

The voltage varying unit 519 according to another embodiment, as shown in FIG. 7, may respectively shift the voltage levels or amplitudes of the first to fourth reference touch pulses, supplied from the clock signal generator 511, according to the first to fourth modulation voltages V1 to V4 selected and supplied by the voltage selector 517 to generate the first to fourth driving pulses during the non-touch period NTP of the touch sensing period TP, and then, during the actual touch period RTP of the touch sensing period TP, may shift the voltage levels or amplitudes of the fifth to eighth reference touch pulses, supplied from the clock signal generator 511, according to the first modulation voltage V1 selected and supplied by the voltage selector 517 to generate the fifth to eighth driving pulses.

The first driving signal generator 510 may generate the first touch driving signal TDS having a plurality of driving pulses having progressively reduced amplitudes during the non-touch period NTP of the touch sensing period TP, and thus, undesired power consumption is reduced in the non-touch period NTP of the touch sensing period TP, thereby reducing power consumption of the display device.

The second driving signal generator 530 may generate the second touch driving signal TDS' having a plurality of driving pulses having progressively reduced amplitudes to supply the second touch driving signal TDS' to the gate driving circuit unit 600 during the non-touch period NTP of the touch sensing period TP. Here, the second touch driving signal TDS' may swing to have the same phase and the same voltage difference as the first touch driving signal TDS. That is, since the second touch driving signal TDS' is supplied to the gate lines during the touch sensing period TP, the second touch driving signal TDS' has a characteristic of swinging to have the same phase and the same voltage difference as the first touch driving signal TDS near a voltage level of a gate low voltage VGL that turns off a TFT in order for the TFT of each subpixel to maintain a turn-off state during the touch sensing period TP. For example, if the first touch driving signal TDS has a voltage level that swings within a range from 2 V to 8 V, the second touch driving signal TDS' may have a voltage level that swings within a range from −10 V to −4 V. Accordingly, power consumption is reduced in the touch sensing period TP without affecting an image which is displayed even during the touch sensing period TP according to the second touch driving signal TDS' supplied to the gate lines.

The second driving signal generator 530 according to an embodiment may generate the second touch driving signal TDS' having a voltage level, which swings to have the same phase and the same voltage difference as the first touch driving signal TDS, in the same method as the first driving signal generator 510. That is, the second driving signal generator 530 according to an embodiment may include a clock signal generator 511, a power switch 513, a modulation voltage generator 515, a voltage selector 517, and a voltage varying unit 519. Except for a modulation voltage generated by the modulation voltage generator 515, the second driving signal generator 530 is similar to the first driving signal generator 510, and thus, detailed description thereof is omitted.

The touch driving signal generator 500 may generate the first and second touch driving signals TDS and TDS' having a plurality of driving pulses having progressively reduced amplitudes during the non-touch period NTP of the touch sensing period TP, and thus, power consumption is reduced in the non-touch period NTP of the touch sensing period TP, thereby reducing power consumption of the display device.

Figure 10:
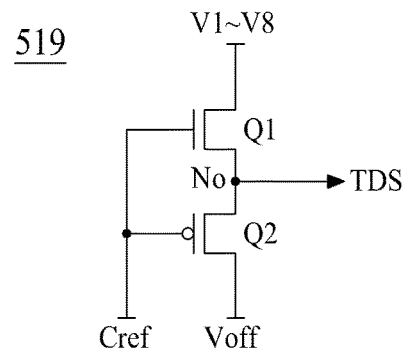
FIG. 10 is a diagram for describing a voltage varying unit according to an embodiment illustrated in FIG. 9.

FIG. 10 is a diagram for describing the voltage varying unit 519 according to an embodiment illustrated in FIG. 9.

Referring to FIGS. 9 and 10, the voltage varying unit 519 according to an embodiment may include first and second transistors Q1 and Q2.

The first transistor Q1 may be turned on by a high level of the reference clock signal Cref having a plurality of reference touch pulses to output the reference voltage level V1 supplied from the power switch 513 or the modulation voltages V1 to V8 supplied from the voltage selector 517 to an output terminal No. The first transistor Q1 may be an N-type transistor, for example, an NMOS transistor.

The second transistor Q2 may be turned on by a low level of the reference clock signal Cref having the plurality of reference touch pulses to output an off voltage Voff, supplied from a power circuit, to the output terminal No. Here, the off voltage Voff may stop (or off) a load reduction driving operation of reducing a load of each of touch electrodes caused by a parasitic capacitance between the gate lines, the data lines, and the touch electrodes TE to enhance a touch sensitivity, and may have a ground voltage level. The second transistor Q2 may be a P-type transistor, for example, a PMOS transistor.

During the image display period DP, the voltage varying unit 519 may output the plurality of reference touch pulses having a high level of the reference voltage level V1 and a low level of the off voltage Voff by using the first and second transistors Q1 and Q2 which are alternately toggled on/off according to the reference clock signal Cref. Also, during the touch sensing period TP, the voltage varying unit 519 may output the plurality of reference touch pulses having a high level of each of the modulation voltages V1 to V8 selected by the voltage selector 517 and a low level of the off voltage Voff by using the first and second transistors Q1 and Q2 which are alternately toggled on/off according to the reference clock signal Cref.

Figure 11:
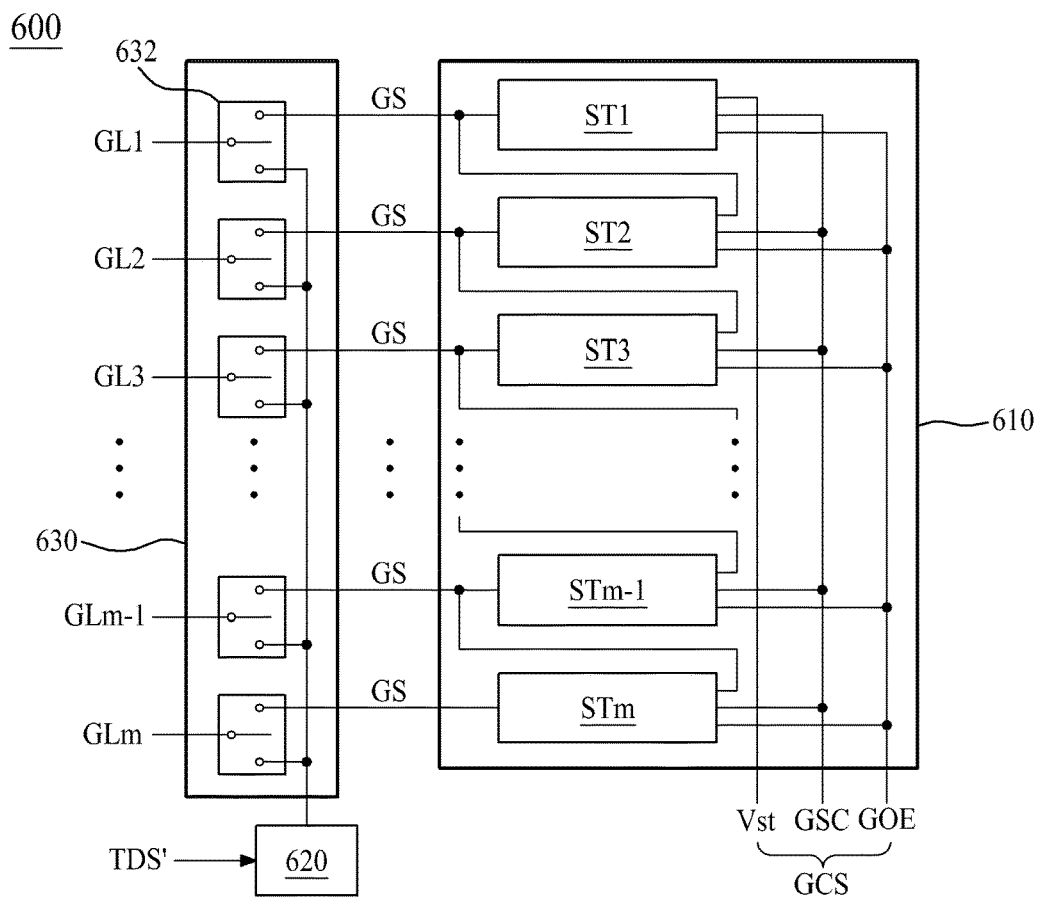
FIG. 11 is a diagram for describing a gate driving circuit unit of the display device according to an embodiment illustrated in FIG. 2.

FIG. 11 is a diagram for describing the gate driving circuit unit 600 of the display device according to an embodiment illustrated in FIG. 2.

Referring to FIGS. 2, 3 and 11, the gate driving circuit unit 600 according to an embodiment may include a gate driver 610, a second touch driving pulse supply unit 620, and a second switching unit 630.

During the image display period DP, the gate driver 610 may generate the gate signal GS, which is sequentially shifted, to supply the gate signal GS to the second switching unit 630 in response to the gate control signal GCS supplied from the timing controller 200. The gate driver 610 according to an embodiment may be configured with a shift register including a plurality of stages ST1 to STm which are connected in cascade.

The plurality of stages ST1 to STm may generate the gate signal GS which is sequentially shifted, based on a gate start pulse Vst and a gate shift clock GSC of the gate control signal GCS and may output the generated gate signal GS to the second switching unit 630 according to a gate output enable signal GOE of the gate control signal GCS. The plurality of stages ST1 to STm may have the same configuration as that of a gate driver of a general display device that sequentially outputs the gate signal GS, and may perform the same function as that of the gate driver.

The second touch driving pulse supply unit 620 may supply the second touch driving signal TDS', supplied from the touch driving signal generator 500, to the second switching unit 630. The second touch driving pulse supply unit 620 may be omitted, and in this case, the second touch driving signal TDS' supplied from the touch driving signal generator 500 may be directly supplied to the second switching unit 630.

The second switching unit 630 may connect the plurality of gate lines GL1 to GLm to the gate driver 610 or the second touch driving pulse supply unit 620 in response to the touch synchronization signal TSS supplied from the timing controller 200. To this end, the second switching unit 630 may include a plurality of second switch elements 632 which are switched on/off in response to the touch synchronization signal TSS.

The plurality of second switch elements 632 according to an embodiment may supply the gate signal GS, sequentially supplied from the gate driver 610, to the plurality of gate lines GL1 to GLm during the image display period DP. Also, the plurality of second switch elements 632 according to an embodiment may simultaneously supply the second touch driving signal TDS', supplied from the second touch driving pulse supply unit 620, to the plurality of gate lines GL1 to GLm during the touch sensing period TP. In this case, the second touch driving signal TDS' supplied to each of the plurality of gate lines GL1 to GLm may have the same phase and the same amplitude as the first touch driving signal TDS.

In addition, the gate driving circuit unit 600 according to an embodiment may be connected to each of one end or/and the other end of each of the plurality of gate lines GL1 to GLm and may be built (or integrated) into a left and/or right non-display area of the display panel 100. That is, the gate driving circuit unit 600 may be built (or integrated) into a left and/or right non-display area of the display panel 100 in a process of manufacturing a TFT included in each subpixel. In this case, the gate driver 610 of the gate driving circuit unit 600 may generate the gate signal GS which is sequentially shifted, based on only the gate start pulse Vst and the gate shift clock GSC of the gate control signal GCS.

The gate driver 610 of the gate driving circuit unit 600 according to an embodiment may be configured with a gate driving IC, and in this case, the second touch driving pulse supply unit 620 and the second switching unit 630 may be built into the gate driving IC or may be disposed outside the gate driving IC.

Figure 12:
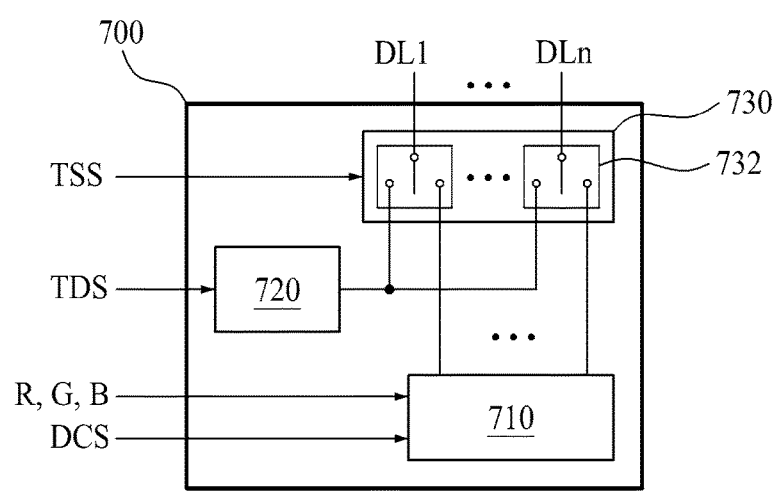
FIG. 12 is a diagram for describing a data driving circuit unit of the display device according to an embodiment illustrated in FIG. 2.

FIG. 12 is a diagram for describing the data driving circuit unit 700 of the display device according to an embodiment illustrated in FIG. 2.

Referring to FIGS. 2, 3 and 12, the data driving circuit unit 700 according to an embodiment may include a data driver 710, a third touch driving pulse supply unit 720, and a third switching unit 730.

The data driver 710 may receive pixel data R, G and B of each subpixel and the data control signal DCS supplied from the timing controller 200 and may convert each of the pixel data R, G and B into an analog data signal Vdata to supply the analog data signal Vdata to the third switching unit 730 according to the data control signal DCS.

The data driver 710 according to an embodiment may include a receiver that receives the pixel data R, G and B of each subpixel and the data control signal DCS, a shift register unit that sequentially outputs a sampling signal, a latch unit that latches the pixel data R, G and B of each subpixel according to the sampling signal, a grayscale voltage generator that subdivides a plurality of reference gamma voltages to generate a plurality of grayscale voltages, an analog-to-digital converter (ADC, not shown) that converts each of the pixel data R, G and B output from the latch unit into the analog data signal Vdata by using the plurality of grayscale voltages, and an output buffer unit that outputs the data signal Vdata to the third switching unit 730.

The third touch driving pulse supply unit 720 may supply the first touch driving signal TDS, supplied from the touch driving signal generator 500, to the third switching unit 730. The third touch driving pulse supply unit 720 may be omitted, and in this case, the first touch driving signal TDS supplied from the touch driving signal generator 500 may be directly supplied to the third switching unit 730.

The third switching unit 730 may connect the plurality of data lines DL1 to DLn to the data driver 710 or the third touch driving pulse supply unit 720 in response to the touch synchronization signal TSS supplied from the timing controller 200. To this end, the third switching unit 730 may include a plurality of third switch elements 732 which are switched on/off in response to the touch synchronization signal TSS.

The plurality of third switch elements 732 according to an embodiment may respectively supply data signals Vdata, supplied from the data driver 710, to the plurality of data lines DL1 to DLn during the image display period DP. Also, the plurality of third switch elements 732 according to an embodiment may simultaneously supply the first touch driving signal TDS, supplied from the third touch driving pulse supply unit 720, to the plurality of data lines DL1 to DLn during the touch sensing period TP. In this case, the first touch driving signal TDS supplied to each of the plurality of data lines DL1 to DLn may have the same phase and the same amplitude as the first touch driving signal TDS supplied to the touch driving circuit unit 300 (or the touch electrode) in synchronization with the first touch driving signal TDS supplied to the touch driving circuit unit 300, and may have the same phase and the same amplitude as the second touch driving signal TDS' supplied to the gate driving circuit unit 600 in synchronization with the second touch driving signal TDS'.

The data driver 710 of the data driving circuit unit 700 according to an embodiment may be configured with a data driving IC, and in this case, the third touch driving pulse supply unit 720 and the third switching unit 730 may be built into the data driving IC or may be disposed outside the data driving IC.

In addition, the data driving circuit unit 700 according to an embodiment may include a touch driving circuit unit 300. That is, the touch driving circuit unit 300 may be one touch driving device (or a touch driving IC) including the data driving circuit unit 700. In this case, according to the present embodiment, the first touch driving signal TDS supplied to the plurality of data lines DL1 to DLn is more accurately synchronized with the first touch driving signal TDS supplied to the touch driving circuit unit 300.

In the display device according to an embodiment, as shown in FIGS. 3 and 5, a parasitic capacitance does not occur between the gate lines GL, the data lines DL, and the touch electrodes TE by varying a voltage level of the touch driving signal TDS, which is supplied to the gate lines GL, the data lines DL, and the touch driving circuit unit 300 in synchronization, according to the presence of a touch during the touch sensing period DP, and thus, a touch sensitivity is enhanced and power consumption can be reduced during the touch sensing period TP, thereby reducing power consumption. That is, in the display device according to an embodiment, a voltage level output from the touch driving circuit TDS which is supplied to the gate lines GL, the data lines DL, and the touch driving circuit unit 300 in synchronization during the non-touch period NTP of the touch sensing period TP may be adjusted to a voltage level different from those of the first and second touch driving signals TDS and TDS' which are supplied during the actual touch period RTP of the touch sensing period TP. Thus, power consumption can be reduced during the non-touch period NTP of the touch sensing period TP.

Figure 13:
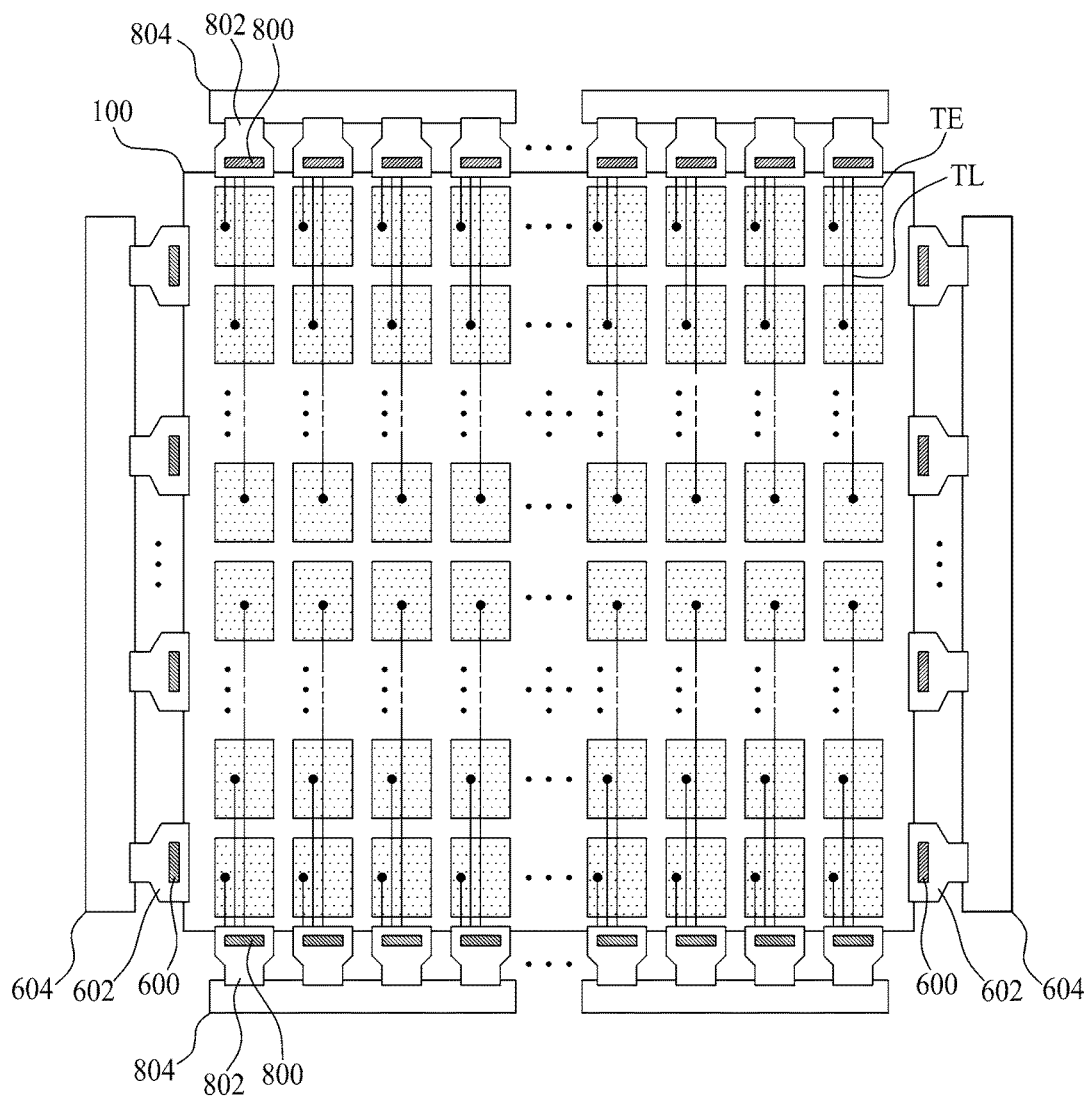
FIG. 13 is a diagram illustrating a front surface of a display device according to another embodiment.
Figure 14:
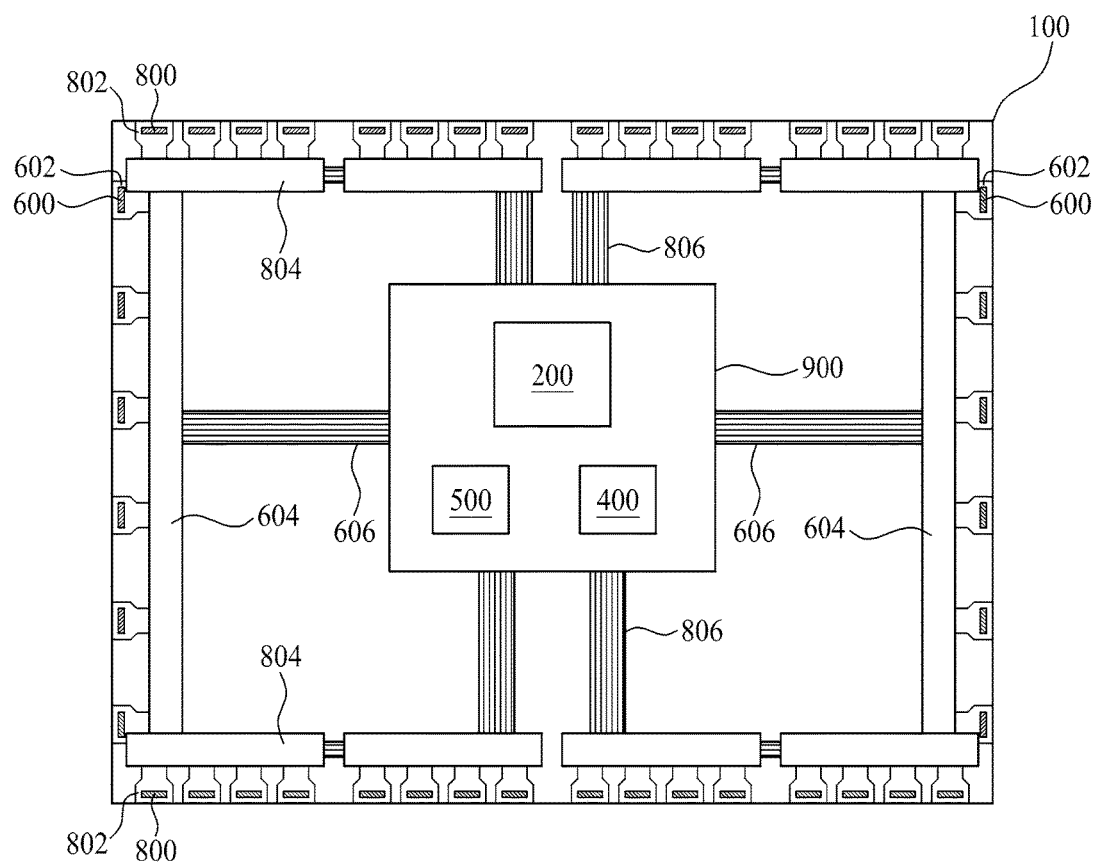
FIG. 14 is a diagram illustrating a rear surface of a display device according to another embodiment.

FIG. 13 is a diagram illustrating a front surface of a display device according to another embodiment, and FIG. 14 is a diagram illustrating a rear surface of a display device according to another embodiment.

Referring to FIGS. 13 and 14, the display device according to another embodiment may include a display panel 100, a timing controller 200, a touch controller 400, a touch driving signal generator 500, a plurality of gate driving circuit units 600, and a plurality of data/touch driving circuit units 800.

The display panel 100 may include a plurality of gate lines, a plurality of data lines, and a plurality of touch link lines TL and may include a touch electrode TE which overlaps with at least one gate line and at least one data line. The display panel 100 may be implemented for a large screen display. For example, a size of the display panel 100 may be 86 inches or more.

The timing controller 200 may be mounted on a control board 900 disposed on a rear surface of the display panel 100. The timing controller 200 may generate a touch synchronization signal for temporally dividing each image frame into an image display period and a touch sensing period and driving each image frame, based on a timing synchronization signal. The timing controller 200 may drive the plurality of data/touch driving circuit units 800 and the data driving circuit unit 700 in the image display period and the touch sensing period at every frame in a time division manner. The timing controller 200 is the same as illustrated in FIG. 2, and thus, its detailed description is not repeated.

The touch controller 400 may be mounted on the control board 900. The touch controller 400 may analyze touch data supplied from the plurality of data/touch driving circuit unit 800 to determine whether there is a touch, generate a touch presence signal and a pulse level selection signal according to a result of the determination, and supply the touch presence signal and the pulse level selection signal to the touch driving signal generator 500. Except that the touch data are received from the plurality of data/touch driving circuit unit 800, the touch controller 400 is the same as illustrated in FIG. 2, and thus, its detailed description is not repeated.

The touch driving signal generator 500 may generate a touch driving signal corresponding to the touch presence signal and the pulse level selection signal supplied from the touch controller 400 during the touch sensing period and may simultaneously supply the touch driving signal to the gate driving circuit unit 600 and the plurality of data/touch driving circuit units 800. Except that the touch driving signal is supplied to the plurality of data/touch driving circuit units 800, the touch driving signal generator 500 is the same as illustrated in FIG. 2, and thus, its detailed description is not repeated. The touch driving signal generator 500 may be mounted on the control board 900 or may be mounted on a separate power board (not shown).

The plurality of gate driving circuit units 600 may be respectively connected to a plurality of first and second gate pad parts respectively provided in a left non-display area and a right non-display area of the display panel 100. The plurality of gate driving circuit units 600 may generate a gate signal to sequentially supply the gate signal to the plurality of gate lines in response to a gate control signal supplied from the timing controller 200 during the image display period. Also, the plurality of gate driving circuit units 600 may simultaneously supply a touch driving signal, supplied from the touch driving signal generator 500, to all of the gate lines in response to the touch synchronization signal supplied from the timing controller 200 during the touch sensing period.

Each of the plurality of gate driving circuit units 600 may be configured with a gate driving IC, and the gate driving IC may be mounted on a gate circuit film 602 and may be connected to the gate pad part through the gate circuit film 602. Also, a plurality of gate circuit films 602 on which the plurality of gate driving circuit units 600 are respectively mounted may be connected to a gate printed circuit board (PCB) 604, and the gate PCB 604 may be connected to the control board 900 through a gate signal cable 606. Therefore, the gate control signal output from the timing controller 200 may be supplied to the gate driving IC through the gate signal cable 606, the gate PCB 604, and the gate circuit film 602.

The gate PCB 604 may be omitted, and in this case, the gate control signal output from the timing controller 200 may be supplied to the gate driving IC through the data/touch driving circuit unit 800, the display panel 100, and the gate circuit film 602.

In one embodiment, the gate driving IC may be directly bonded to the gate pad part in a chip-on glass (COG) bonding type, and in this case, the gate control signal output from the timing controller 200 may be supplied to the gate driving IC through the data/touch driving circuit unit 800 and the display panel 100. In the COG bonding type, the plurality of gate circuit films 602 and the gate PCB 604 may be omitted.

The plurality of data/touch driving circuit units 800 may be respectively connected to the plurality of first and second gate pad parts respectively provided in the left non-display area and the right non-display area of the display panel 100.

The plurality of data/touch driving circuit units 800 may be respectively mounted on the plurality of data circuit films 802. The plurality of data circuit films 802 may be connected to the data PCB 804, and the data PCB 804 may be connected to the control board 900 through the data signal cable 806. Therefore, a data control signal, pixel data, and the touch synchronization signal which are output from the timing controller 200 may be supplied to a corresponding data/touch driving circuit unit 800 through the data signal cable 806, the data PCB 804, and the data circuit film 802.

The plurality of data/touch driving circuit units 800 may each be a source/touch driving IC which includes the data driving circuit unit and the touch driving circuit unit illustrated in FIG. 2. Each of the plurality of data/touch driving circuit units 800 may simultaneously perform a function of the data driving circuit unit and a function of the touch driving circuit unit during the image display period to supply a data signal to a corresponding data line and supply a common voltage to a touch electrode TE through a corresponding touch link line TL. Also, in response to the touch synchronization signal supplied from the timing controller 200 during the touch sensing period, each of the plurality of data/touch driving circuit units 800 may supply a touch driving signal to all of the data lines, sense a capacitance variation of the touch electrode TE through the touch link line TL to generate touch data, and supply the touch data to the touch controller 400.

Figure 15:
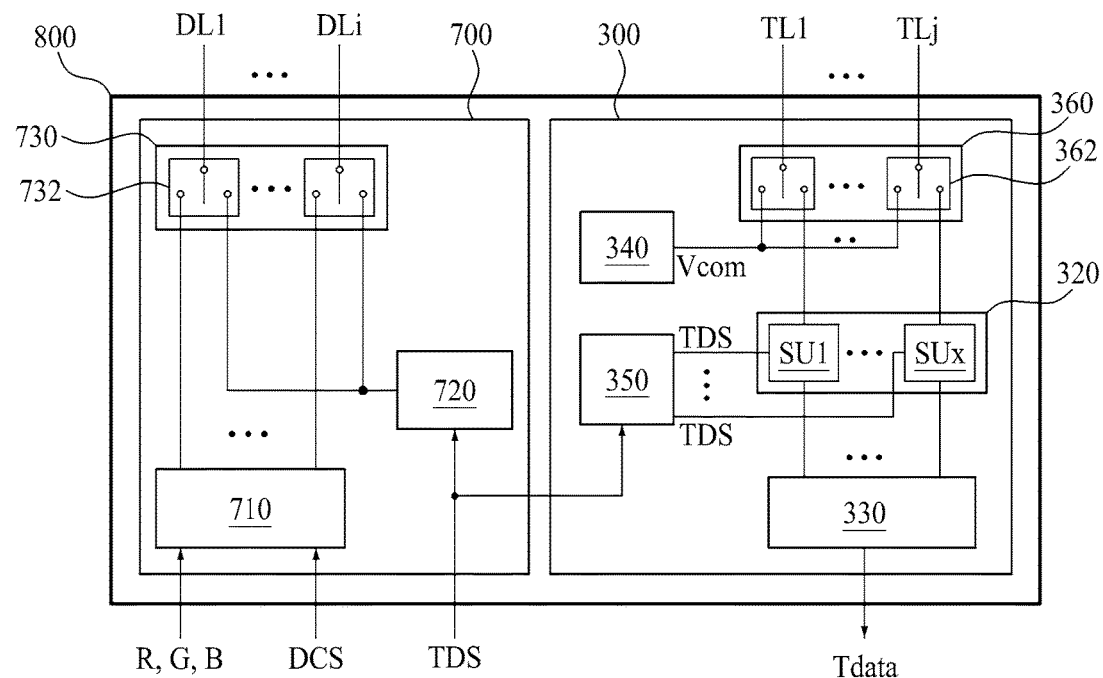
FIG. 15 is a diagram for describing a plurality of data/touch driving circuit units illustrated in FIG. 13.

FIG. 15 is a diagram for describing the plurality of data/touch driving circuit units 800 illustrated in FIG. 13.

Referring to FIGS. 13 to 15, the plurality of data/touch driving circuit units 800 according to an embodiment may each include a data driving circuit unit 700 and a touch driving circuit unit 300. That is, each of the plurality of data/touch driving circuit units 800 may be an integrated driving IC where the touch driving circuit unit 300 illustrated in FIG. 8 and the data driving circuit unit 700 illustrated in FIG. 12 are built into one IC.

Each of the plurality of data/touch driving circuit units 800 may be connected to the data lines in a one-to-one relationship in units of i number of data lines and may be connected to the touch link lines in a one-to-one relationship in units of j number of touch link lines. For example, in a first data/touch driving circuit unit 800, the data driving circuit unit 700 may be connected to first to ith data lines DL1 to DLi in a one-to-one relationship, and the touch driving circuit unit 300 may be connected to first to jth touch link lines TL1 to TLj in a one-to-one relationship.

Each of the plurality of data/touch driving circuit units 800 according to an embodiment may be configured as one integrated IC, into which the data driving circuit unit 700 and the touch driving circuit unit 300 are integrated. Thus, a first touch driving signal TDS supplied to the data lines DL1 to DLn can be more accurately synchronized with a first touch driving signal TDS supplied to the touch driving circuit unit 300.

In addition, each of the plurality of data/touch driving circuit units 800 may further include a touch controller 400.

The touch controller 400 may analyze touch data Tdata supplied from the touch driving circuit unit 300 to generate a touch presence signal TSES and a pulse level selection signal PLSS, supply the touch presence signal TSES and the pulse level selection signal PLSS to the touch driving signal generator 500, calculate touch position information based on the touch data Tdata, and supply the touch position information to a host controller. In this case, the touch driving signal generator 500 may generate and output a touch driving signal, based on the touch presence signal TSES and the pulse level selection signal PLSS supplied from the touch controller 400 built into each of the plurality of data/touch driving circuit units 800.

In the display device according to another embodiment, as shown in FIGS. 3 and 5, voltage levels of touch driving signals TDS and TDS', which are synchronized with each other and are supplied to the gate lines GL, the data lines DL, and the touch driving circuit unit 300 during the non-touch period NTP of the touch sensing period TP, may be adjusted to a voltage level different from those of the first and second touch driving signals TDS and TDS' which are supplied during the actual touch period RTP of the touch sensing period TP.

FIGS. 16 to 20 are waveform diagrams showing a touch driving signal according to different embodiments.

Figure 16:
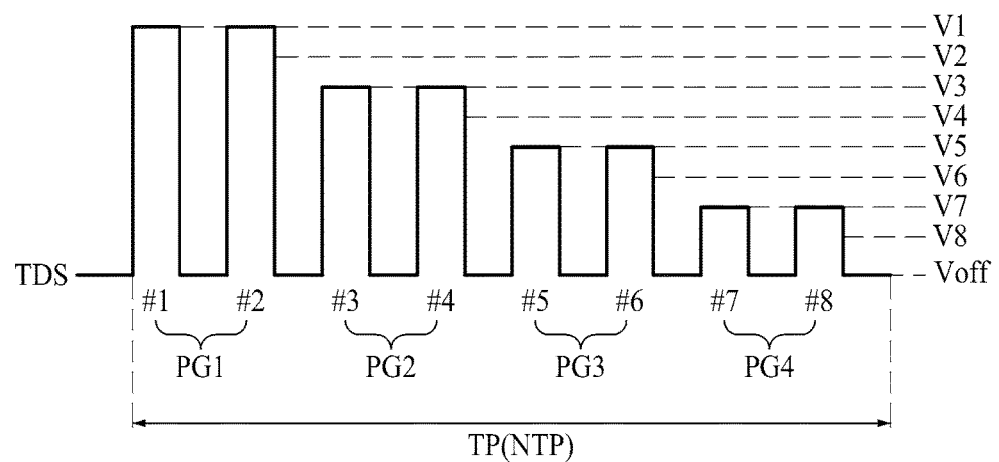
FIG. 16 is a waveform diagram for describing a touch driving signal according to one embodiment.

Referring to FIGS. 2 and 16, a first touch driving signal TDS according to a first modification embodiment may include a plurality of pulse groups PG1 to PG4, and each of the plurality of pulse groups PG1 to PG4 may include two or more driving pulses having the same voltage level.

For example, during the non-touch period NTP of the touch sensing period TP, a touch driving signal generator 500 according to a second embodiment may progressively reduce voltage levels of two or more driving pulses #1 and #2, #3 and #4, #5 and #6, and #7 and #8 of the respective pulse groups PG1 to PG4 from the reference voltage level V1 and may output the level-lowered driving pulses, in response to a second touch presence signal and a pulse level selection signal having a variable level data value which are supplied from the touch controller 400. For example, the driving pulses #1 and #2 of a first pulse group PG1 may have a high level of a first modulation voltage V1 and a low level of an off voltage Voff, respectively, and the driving pulses #7 and #8 of a fourth pulse group PG4 may have a high level of a seventh modulation voltage V7 and a low level of the off voltage Voff, respectively.

In addition, high levels of the driving pulses #1 and #2, #3 and #4, #5 and #6, and #7 and #8 of the respective pulse groups PG1 to PG4 may be progressively decreased in that sequence by a predetermined voltage from the reference voltage level V1. In other embodiments, the high levels of the driving pulses #1 and #2, #3 and #4, #5 and #6, and #7 and #8 of the respective pulse groups PG1 to PG4 may be progressively decreased from the reference voltage level V1 by a different amount or a different manner than shown in FIG. 16, based on a voltage difference between the reference voltage level V1 and the off voltage Voff.

In the first touch driving signal TDS shown in FIG. 16, during the non-touch period NTP of the touch sensing period TP, the two or more driving pulses included in each of the pulse groups PG1 to PG4 may have the same amplitude. Accordingly, power consumption is reduced in the non-touch period NTP, and a voltage level or amplitude of a driving pulse can be varied easily.

Figure 17:
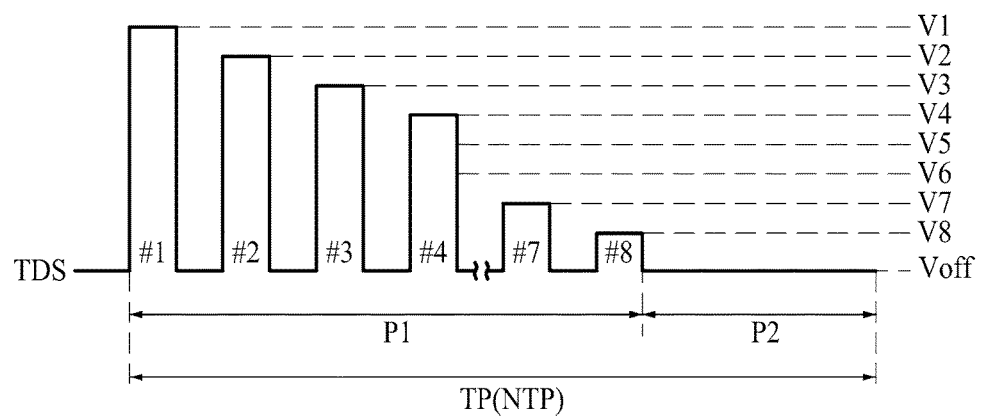
FIG. 17 is a waveform diagram for describing a touch driving signal according to one embodiment.

Referring to FIGS. 2 and 17, a first touch driving signal TDS according to another embodiment may be supplied during only a certain time in the touch sensing period TP. In this case, the touch sensing period TP may have a pulse supply period P1 and a pulse off period P2. A plurality of driving pulses #1 to #8 having voltage levels or amplitudes which are progressively reduced may be supplied during the pulse supply period P1, and an off voltage Voff may be supplied during the pulse off period P2.

For example, during the pulse supply period P1 of the touch sensing period TP, a touch driving signal generator 500 according to a third embodiment may progressively decrease voltage levels of a plurality of driving pulses #1 to #8 from the reference voltage level V1 and may output the driving pulses having progressively decreasing amplitudes, in response to a second touch presence signal and a pulse level selection signal having a variable level data value which are supplied from the touch controller 400. During the pulse off period P2 of the touch sensing period TP, the touch driving signal generator 500 may output an off voltage Voff. That is, during the non-touch period NTP of the touch sensing period TP, the touch driving signal generator 500 according to the third embodiment may progressively decrease voltage levels of the plurality of driving pulses #1 to #8 from the reference voltage level V1 and then may deactivate (or off) the first touch driving signal TDS.

The touch driving signal TDS may be gradually reduced and then may be deactivated during the non-touch period NTP of the touch sensing period TP. By deactivating (or off) the first touch driving signal TDS, power consumption can be reduced in the non-touch period NTP.

Figure 18:
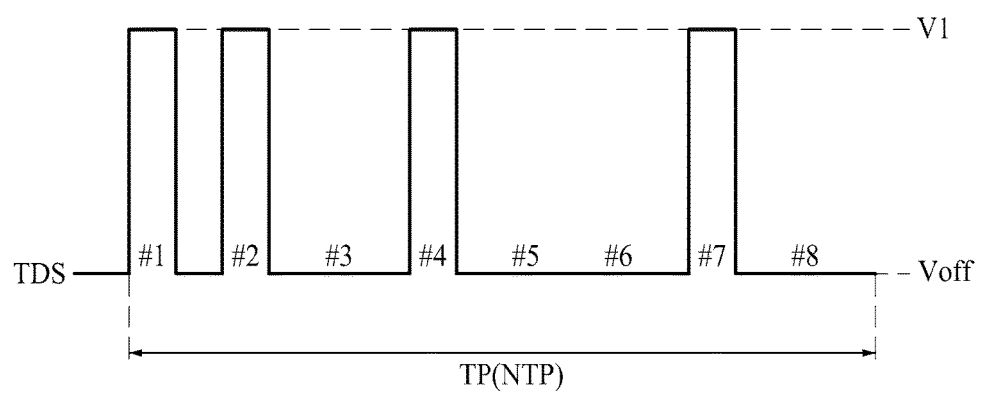
FIG. 18 is a waveform diagram for describing a touch driving signal according to one embodiment.

Referring to FIGS. 2 and 18, a first touch driving signal TDS according to another embodiment may include a plurality of driving pulses #1, #2, #4 and #7 having different periods (or frequencies) during the non-touch period NTP of the touch sensing period TP.

For example, during the non-touch period NTP of the touch sensing period TP, in response to a second touch presence signal and a pulse level selection signal having a variable level data value which are supplied from the touch controller 400, a touch driving signal generator 500 may shift voltage levels of some driving pulses #1, #2, #4 and #7 of a plurality of driving pulses #1 to #8 to the reference voltage level V1 and may shift voltage levels of the other driving pulses #3, #5, #6 and #8 of the plurality of driving pulses #1 to #8 to a voltage level of an off voltage Voff, thereby outputting the driving pulses #1, #2, #4 and #7 having different periods.

As another example, the touch driving signal generator 500 according to the fourth embodiment may generate a reference clock signal including a plurality of reference touch pulses having different periods during non-touch period NTP of the touch sensing period TP, and by shifting the reference touch pulses of the reference clock signal to the reference voltage level V1, may output the driving pulses #1, #2, #4 and #7 having different periods.

In addition, the touch driving signal generator 500 according another embodiment may output the driving pulses #1, #2, #4 and #7 having different periods. In this case, the touch driving signal generator 500 may progressively reduce voltage levels of the driving pulses #1, #2, #4 and #7, or may divide the driving pulses #1, #2, #4 and #7 into a plurality of pulse groups and progressively reduce voltage levels of driving pulses for each of the pulse groups.

In the first touch driving signal TDS according another embodiment, the driving pulses #1, #2, #4 and #7 may have different periods during the non-touch period NTP of the touch sensing period TP. By lowering a frequency of each of the driving pulses #1, #2, #4 and #7, power consumption can be further reduced in the non-touch period NTP.

The touch driving signal generator 500 according to another embodiment may reduce a period of each of a plurality of driving pulses to a predetermined specific period (or a frequency) at a time. For example, referring to FIG. 18, during the non-touch period NTP of the touch sensing period TP, the touch driving signal generator 500 according to another embodiment may shift voltage levels of first, fourth, and seventh driving pulses #1, #4 and #7 of the plurality of driving pulses #1 to #8 to the reference voltage level V1 and may shift voltage levels of second, third, fifth, sixth, and eighth driving pulses #2, #3, #5, #6 and #8 of the plurality of driving pulses #1 to #8 to the voltage level of the off voltage Voff, thereby outputting the first, fourth, and seventh driving pulses #1, #4 and #7 at the same period which is reduced in comparison with a reference period.

Figure 19:
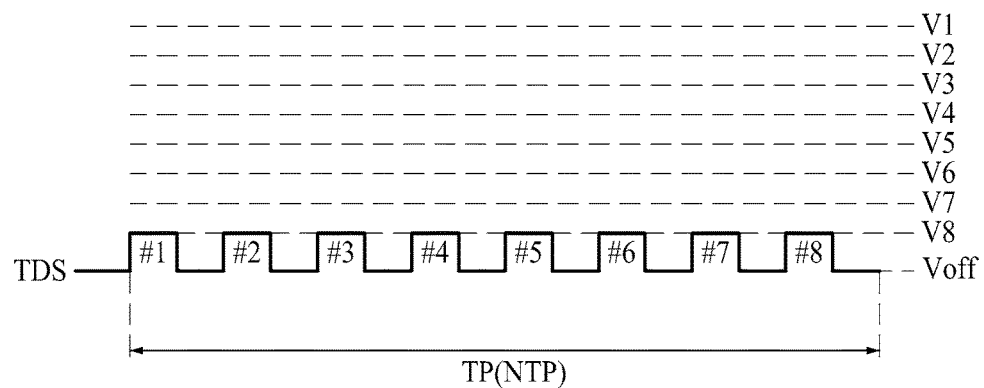
FIG. 19 is a waveform diagram for describing a touch driving signal according to one embodiment.

Referring to FIGS. 2 and 19, a first touch driving signal TDS according to another embodiment may include a plurality of driving pulses #1 to #8 having a voltage level lower than the reference voltage level V1 during the non-touch period NTP of the touch sensing period TP. For example, each of the plurality of driving pulses #1 to #8 may have a voltage level of one of second to eighth modulation voltages V2 to V8 having a voltage level which is lower than the reference voltage level V1.

For example, during the non-touch period NTP of the touch sensing period TP, in response to a second touch presence signal and a pulse level selection signal having a variable level data value which are supplied from the touch controller 400, a touch driving signal generator 500 according to another embodiment may shift a voltage level of each of a plurality of driving pulses #1 to #8 to an eighth modulation voltage V8 lower than the reference voltage level V1 and may output the level-shifted driving pulses.

In addition, the touch driving signal generator 500 may shift the voltage level of each of the plurality of driving pulses #1 to #8 to one of second to eighth modulation voltages V2 to V8 lower than the reference voltage level V1 and may output the level-shifted driving pulses.

The first touch driving signal TDS may include a plurality of driving pulses #1 to #8 having a voltage level lower than the reference voltage level V1 during the non-touch period NTP of the touch sensing period TP. By lowering a voltage level of each of the plurality of driving pulses #1 to #8, power consumption can be further reduced.

Figure 20:
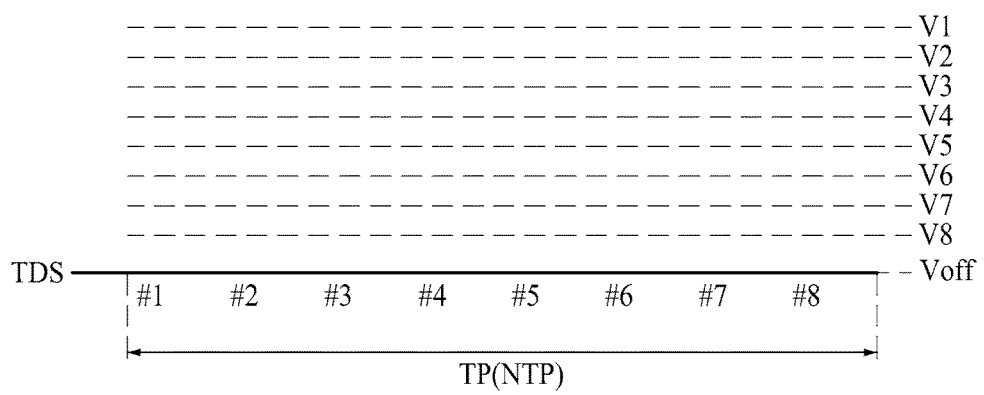
FIG. 20 is a waveform diagram for describing a touch driving signal according to one embodiment.

Referring to FIGS. 2 and 20, a first touch driving signal TDS according to another embodiment may have a voltage level of an off voltage Voff during the non-touch period NTP of the touch sensing period TP.

For example, during the non-touch period NTP of the touch sensing period TP, a touch driving signal generator 500 may output an off voltage Voff in response to a second touch presence signal and a pulse level selection signal having a variable level data value which are supplied from the touch controller 400. That is, during the non-touch period NTP of the touch sensing period TP, the touch driving signal generator 500 may generate a reference clock signal which is maintained in the same level, and by shifting the reference clock signal to a voltage level of the off voltage Voff, the touch driving signal generator 500 may output the first touch driving signal TDS having the voltage level of the off voltage Voff.

The first touch driving signal TDS may have the voltage level of the off voltage Voff during the non-touch period NTP of the touch sensing period TP. By stopping a load reduction driving operation based on the off voltage Voff, power consumption can be minimized.

In addition, as shown in FIG. 5, when an actual touch RT occurs in the touch sensing period TP, a touch driving signal generator 500 may increase a period of each of the other driving pulses of the plurality of driving pulses #1 to #8 during the actual touch period RTP of the touch sensing period TP corresponding to a time when the actual touch RT occurs.

Except for having a voltage level which swings to have the same phase and the same voltage difference, the second touch driving signal TDS' supplied to the gate lines in the non-touch period of the touch sensing period according to an embodiment may be the same as the first touch driving signal TDS as illustrated in FIGS. 16 to 20, and thus, their detailed descriptions are omitted.

As describe above, according to the various embodiments disclosed herein, in the touch sensing period, power consumption can be reduced by varying a voltage level or an amplitude of the touch driving signal supplied to the gate lines, the data lines, and the touch electrodes according to whether there is a touch or not, thereby decreasing power consumption of the touch driving device and/or the display device.

It will be apparent to those skilled in the art that various modifications and variations can be made in the present invention without departing from the spirit or scope of the inventions.

What is claimed is:
1. A touch driving device for driving a touch sensitive display panel, comprising:
 a first circuit configured to generate a touch driving signal including a plurality of pulses with varying amplitudes or varying periods, responsive to detection of presence or absence of a touch on the touch sensitive display panel during a touch sensing period, and
 a second circuit configured to apply the touch driving signal to a touch electrode of the touch sensitive display panel during the touch sensing period,
 wherein the touch sensing period comprises a touch period or a non-touch period according to whether the touch sensitive display panel is touched, wherein during the non-touch period, in which the touch sensitive display period is not determined to be touched, at least one of the amplitudes of one or more of the plurality of pulses corresponding to the non-touch period is less than at least one of the amplitudes of one or more of the plurality of pulses corresponding to the touch period, in which the touch sensitive display panel is determined to be touched.
2. The touch driving device of claim 1, wherein the first circuit is configured to generate the touch driving signal which is to be supplied to at least one of a gate line and a data line of the touch sensitive display panel during the touch sensing period.

3. The touch driving device of claim 1, wherein during the non-touch period, in which the touch sensitive display panel is not determined to be touched, the first circuit is further configured to progressively decrease the amplitudes of two or more of the plurality of pulses.
4. The touch driving device of claim 1, wherein during the touch period, in which the touch sensitive display panel is determined to be touched, the first circuit is further configured to progressively increase the amplitudes of two or more pulses of the plurality of pulses.
5. The touch driving device of claim 1, wherein during the non-touch period, the first circuit is further configured to generate two or more pulses of the plurality of pulses having different amplitude.
6. The touch driving device of claim 5, wherein during the non-touch period, at least two of the plurality of pulses have a substantially same amplitude as each other.
7. The touch driving device of claim 1,
 wherein during the non-touch period, in which the touch sensitive display panel is not determined to be touched, the one or more of the plurality of pulses corresponding to the non-touch period have amplitudes lower than a reference amplitude, and
 wherein during the touch period, in which the touch sensitive display panel is determined to be touched, the one or more of the plurality of pulses corresponding to the touch period have the reference amplitude.
8. The touch driving device of claim 1, wherein the first circuit comprises:
 a clock signal generator configured to generate a plurality of reference pulses, each of the plurality of reference pulses associated with a corresponding one of the plurality of pulses;
 a modulation voltage generator configured to divide an input voltage having a reference voltage level to generate a plurality of modulation voltages having different voltage levels;
 a voltage selector configured to select, for each of the plurality of reference pulses, a corresponding modulation voltage from the plurality of modulation voltages; and
 a voltage varying circuit configured to generate the plurality of pulses by changing, for each of the plurality of reference pulses, an amplitude of a reference pulse of the plurality of reference pulses according to the corresponding modulation voltage.
9. The touch driving device of claim 1,
 wherein the touch sensitive display panel displays an image during an image display period, the touch sensitive display panel comprising a gate line and a data line, and
 wherein the first circuit is configured to generate the plurality of pulses which is to be simultaneously supplied to the gate line and the data line during the touch sensing period.
10. The touch driving device of claim 1,
 wherein the touch sensitive display panel displays an image during an image display period, the touch sensitive display panel comprising a gate line and a data line,
 wherein the first circuit is further configured to generate additional plurality of pulses, each of the additional plurality of pulses having a substantially same amplitude as a corresponding one of the plurality of pulses, the one of the plurality of pulses centered around a first voltage level, the additional plurality of pulses centered around a second voltage level different than the first voltage level, and wherein the first circuit is further configured to generate the additional plurality of pulses which is to be supplied to the gate line during the touch sensing period.

11. The touch driving device of claim 1, wherein the second circuit comprises:
a common voltage generator generating a common voltage; and
a first switching unit configured to:
connect the touch electrode to the common voltage generator during an image display period to apply the common voltage to the touch electrode, and
connect the touch electrode to the first circuit to apply the plurality of pulses to the touch electrode and determine whether the touch sensitive display panel is touched or not.

12. The touch driving device of claim 1, further comprising:
a data driving circuit unit configured to:
apply a data signal to a data line during an image display period for displaying an image, and
apply the touch driving signal supplied from the first circuit to the data line during the touch sensing period.

13. The touch driving device of claim 12, wherein the data driving circuit unit further comprises:
a data driver configured to generate the data signal; and
a second switching unit configured to:
connect the data line to the data driver to supply the data signal to the data line during the image display period, and
connect the data line to the first circuit to apply the plurality of pulses to the data line during the touch sensing period.

14. A display device comprising:
a touch sensitive display panel including a gate line, a data line, and a touch electrode;
a first circuit configured to generate a touch driving signal including a plurality of pulses with varying amplitudes or varying periods, responsive to detection of presence or absence of a touch on the touch sensitive display panel during a touch sensing period; and
a second circuit configured to apply the touch driving signal to the touch electrode of the touch sensitive display panel during the touch sensing period,
wherein the touch sensing period comprises a touch period or a non-touch period according to whether the touch sensitive display panel is touched, wherein during the non-touch period, in which the touch sensitive display panel is not determined to be touched, at least one of the amplitudes of one or more of the plurality of pulses corresponding to the non-touch period is less than at least one of the amplitudes of one or more of the plurality of pulses corresponding to the touch period, in which the touch sensitive display panel is determined to be touched.

15. The display device of claim 14, wherein the first circuit is further configured to:
generate the touch driving signal which is to be supplied to at least one of the gate line and the data line of the touch sensitive display panel during the touch sensing period.

16. The display device of claim 14, wherein the first circuit is further configured to:

generate additional plurality of pulses, each of the additional plurality of pulses having a same amplitude with a corresponding one of the plurality of pulses, the plurality of pulses centered around a first voltage level, the additional plurality of pulses centered around a second voltage level different from the first voltage level; and
generate the additional plurality of pulses which is to be supplied to the gate line during the touch sensing period.

17. The display device of claim 14, wherein, during the non-touch period, in which the touch sensitive display panel is not determined to be touched, the first circuit is configured to progressively decrease the amplitudes of two or more of the plurality of pulses.

18. The display device of claim 14, wherein, during the touch period, in which the touch sensitive display panel is determined to be touched, the first circuit is further configured to progressively increase the amplitudes of two or more pulses of the plurality of pulses.

19. A method of sensing a touch by a touch sensitive display panel comprising a gate line, a data line, and a touch electrode, the method comprising:
displaying an image by the touch sensitive display panel during an image display period;
generating a touch driving signal including a plurality of pulses with varying amplitudes or varying periods, responsive to determining whether the touch sensitive display panel is touched or not during a touch sensing period; and
applying the touch driving signal to the touch electrode during the touch sensing period,
wherein the touch sensing period comprises a touch period or a non-touch period according to whether the touch sensitive display panel is touched, wherein during the non-touch period, in which the touch sensitive display panel is not determined to be touched, at least one of the amplitudes of one or more of the plurality of pulses corresponding to the non-touch period is less than at least one of the amplitudes of one or more of the plurality of pulses corresponding to the touch period, in which the touch sensitive display panel is determined to be touched.

20. The method of claim 19, further comprising:
generating additional plurality of pulses, each of the additional plurality of pulses having a same amplitude with a corresponding one of the plurality of pulses, the plurality of pulses centered around a first voltage level, the additional plurality of pulses centered around a second voltage level different from the first voltage level;
applying the additional plurality of pulses to the gate line during the touch sensing period; and
applying the plurality of pulses to the data line during the touch sensing period.

21. The method of claim 19, further comprising:
progressively decreasing amplitudes of two or more of the plurality of pulses, responsive to determining that the touch sensitive display panel is not touched during the non-touch period.

22. The method of claim 21, further comprising:
progressively increasing amplitudes of two or more pulses of the plurality of pulses, responsive to determining that the touch sensitive display panel is touched during the touch period.

* * * * *